May 31, 1932.　　　W. W. SLOANE　　　1,861,194

POWER SHOVEL

Filed Aug. 19, 1927　　　22 Sheets-Sheet 1

Fig. 1

Witness
Herbert Buehler

Inventor
William W. Sloane
by Clarence F. Poole
Attorney

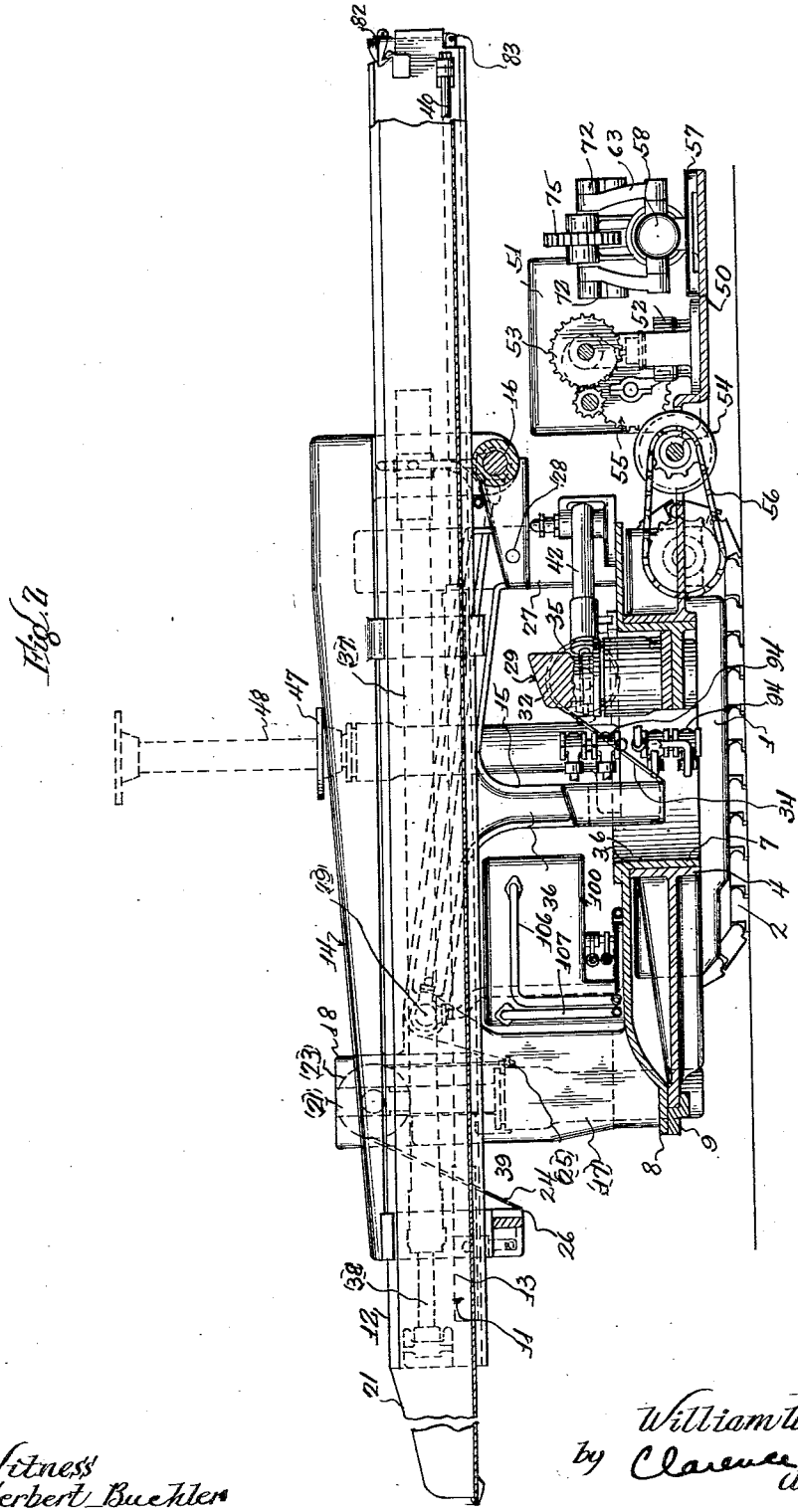

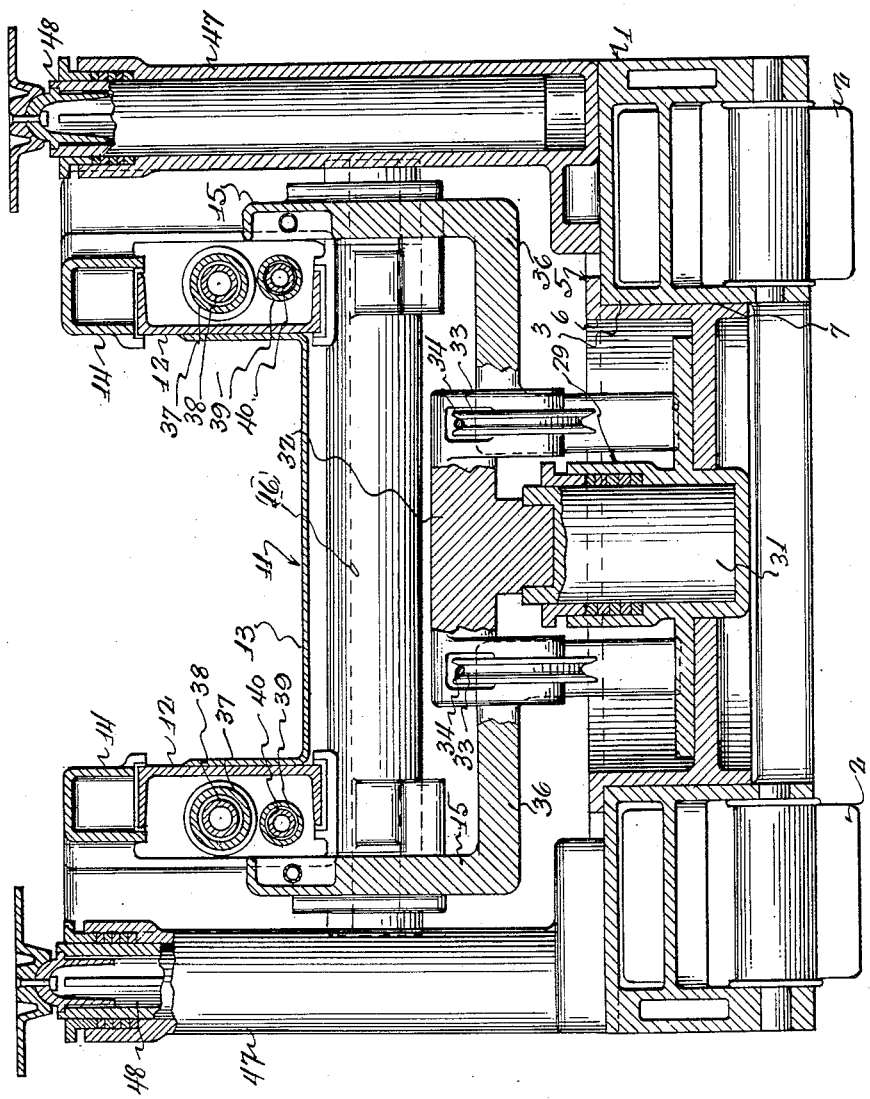

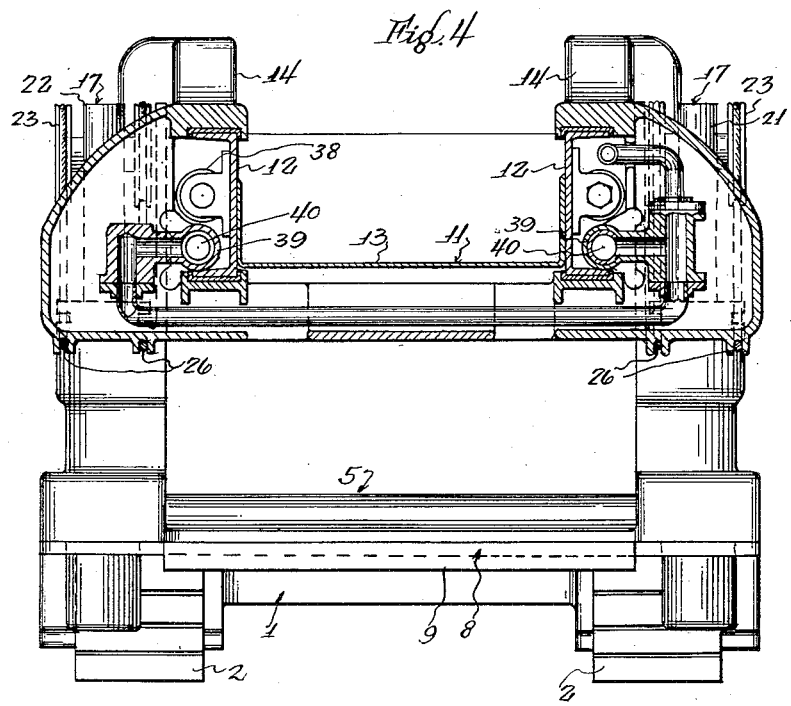
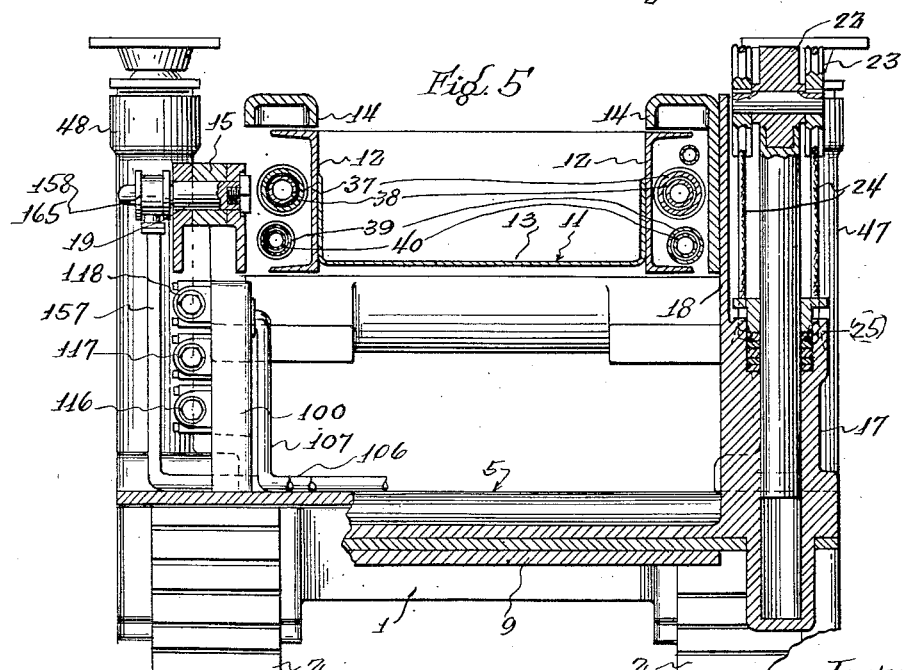

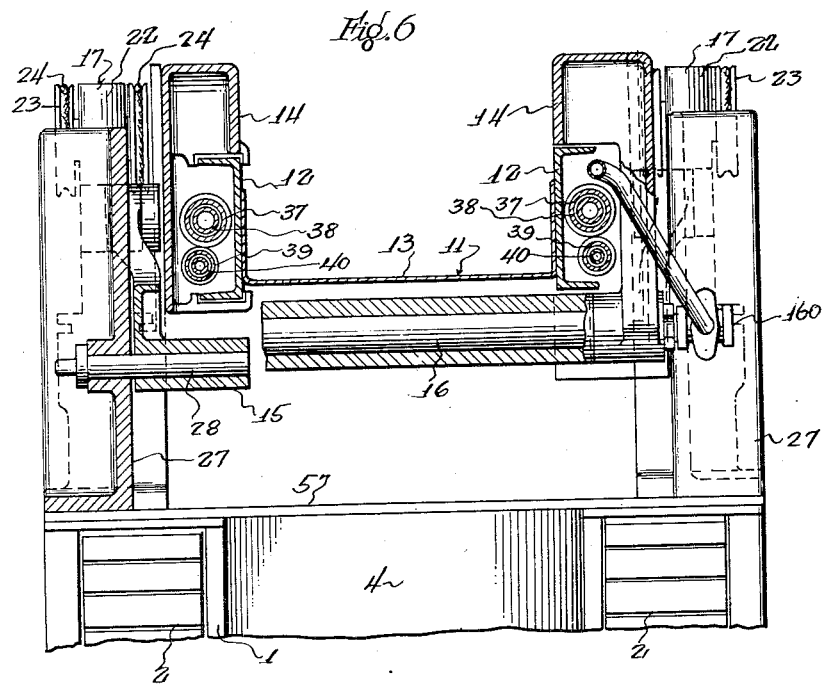
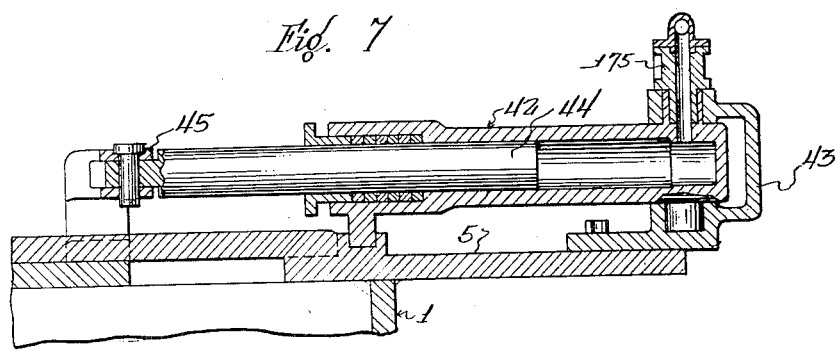

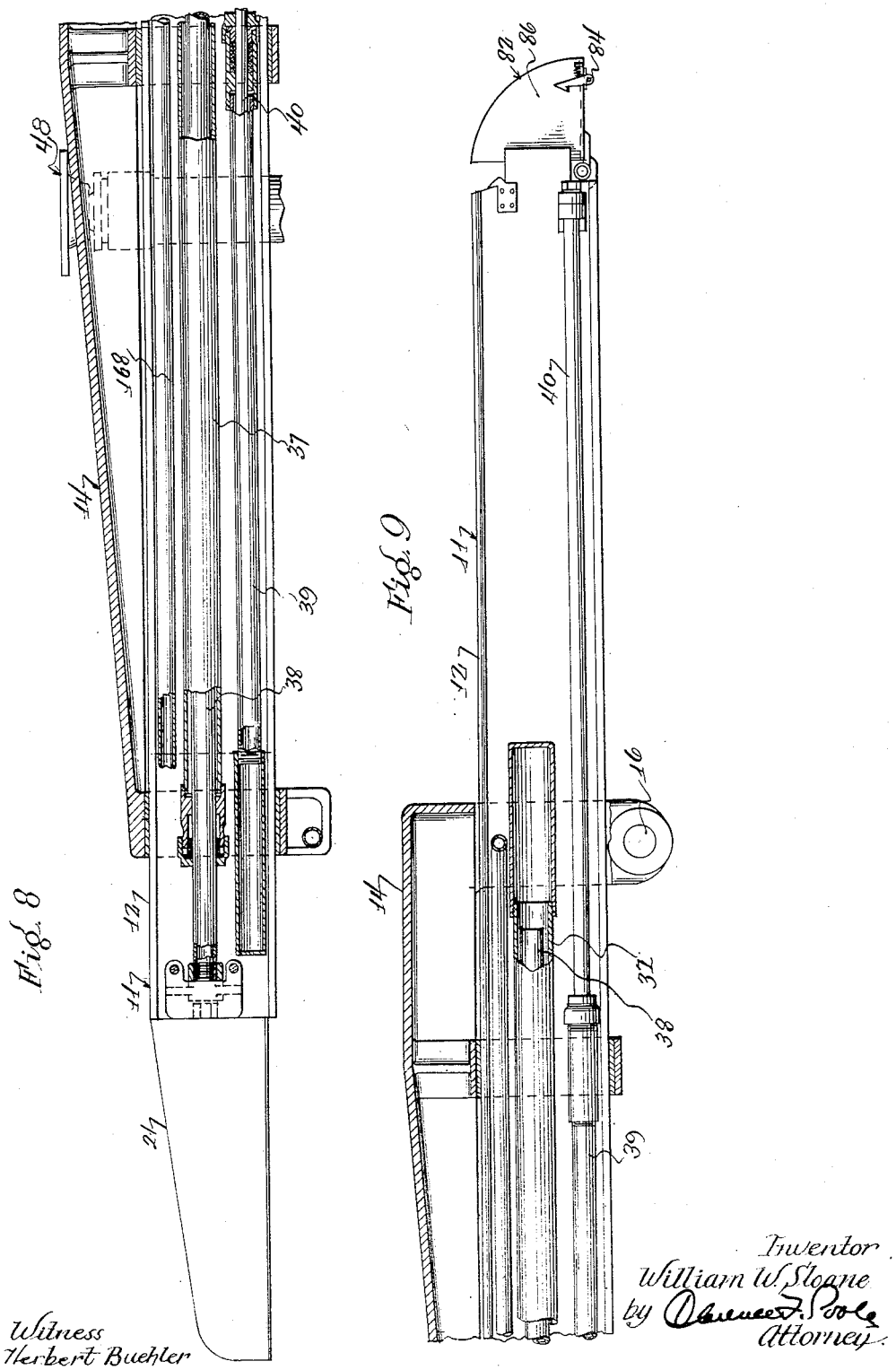

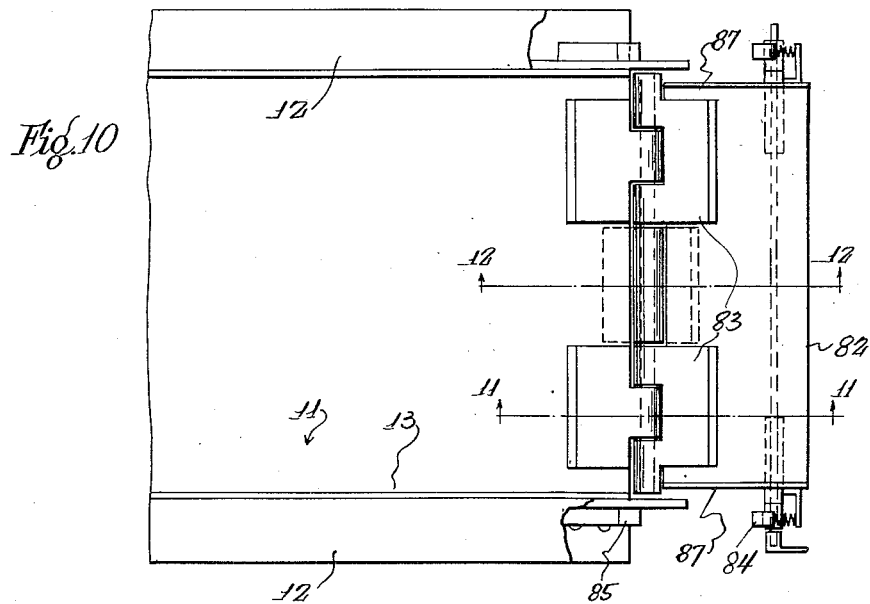
Fig.10
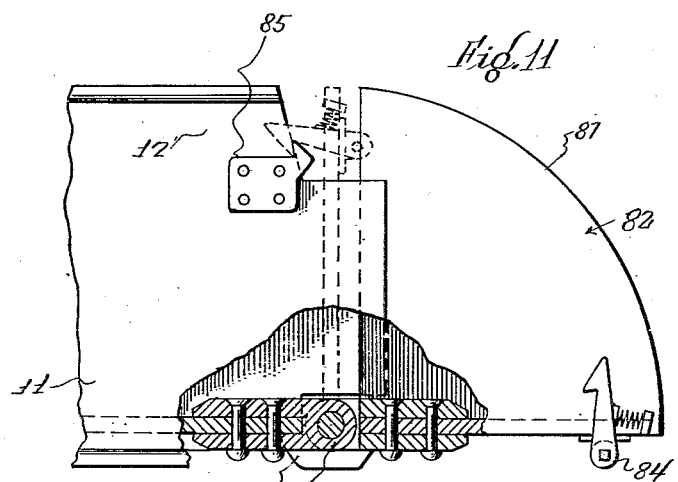
Fig.11
Fig.12
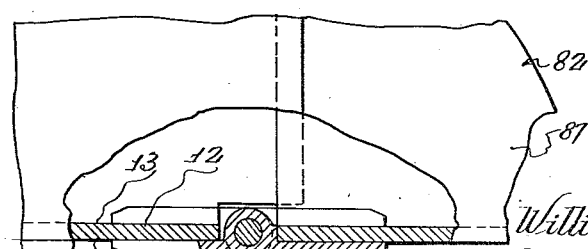
Witness
Herbert Buehler
Inventor
William W. Sloane
by Clarence F. Poole
Attorney

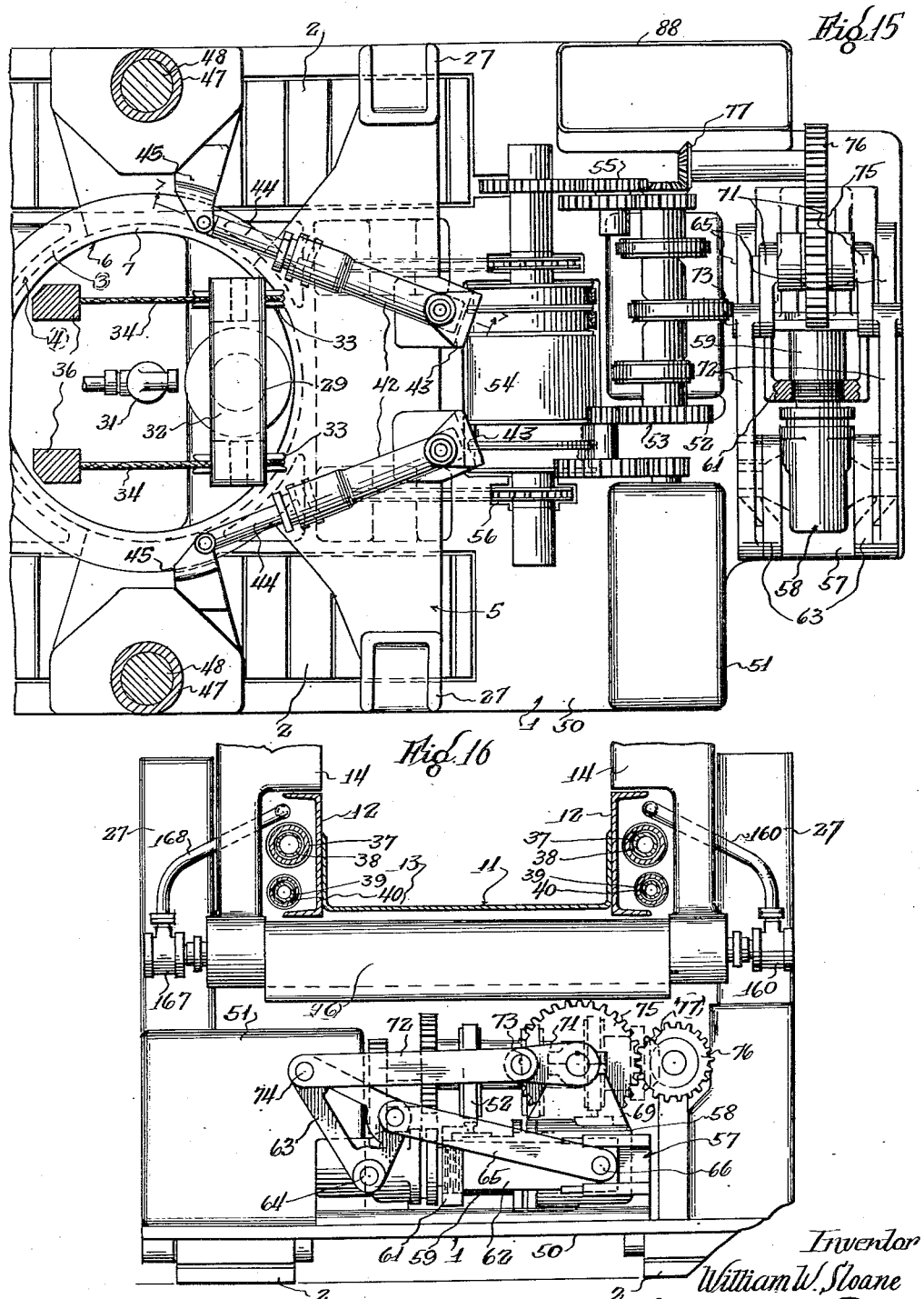

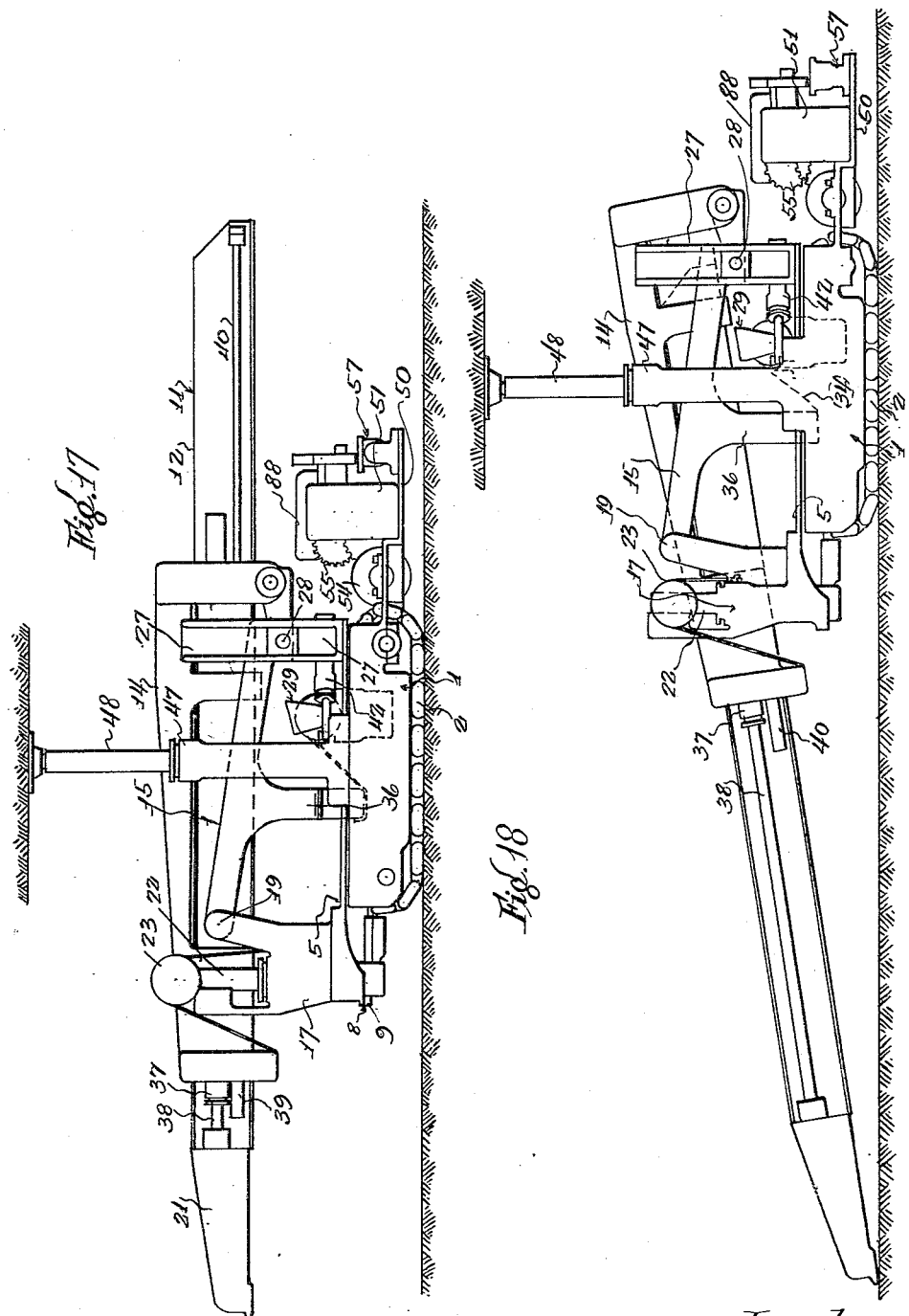

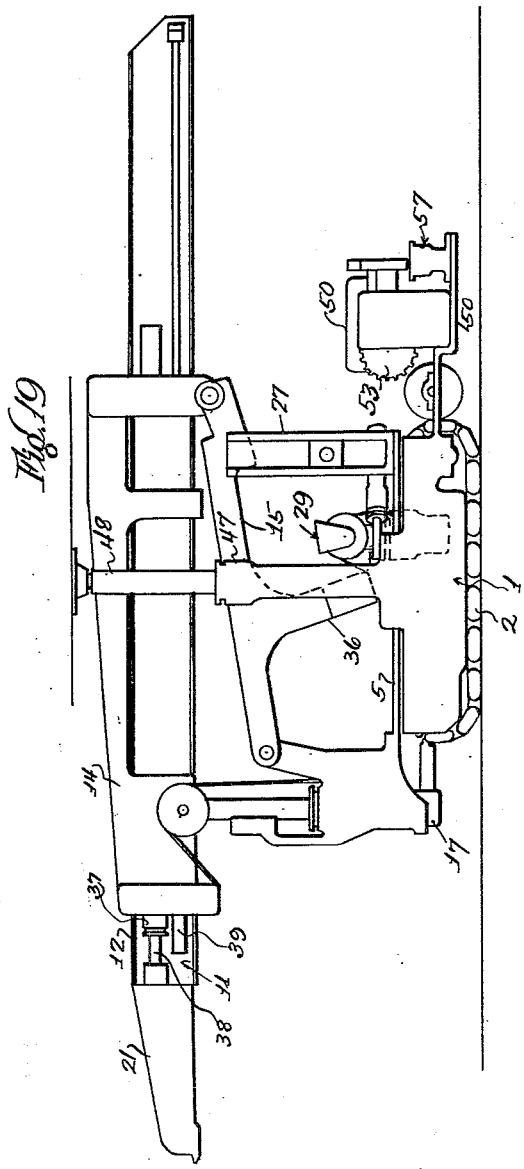

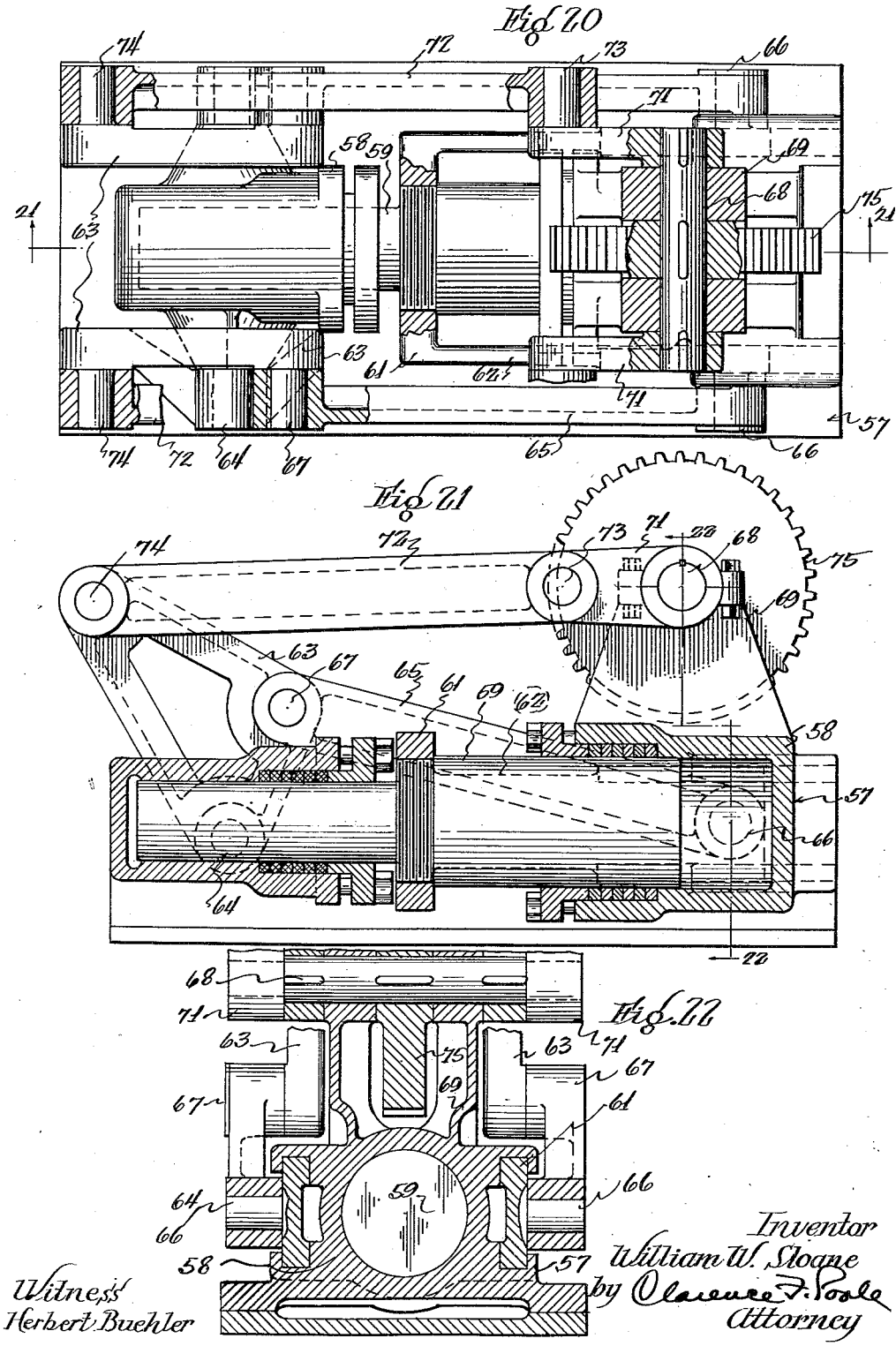

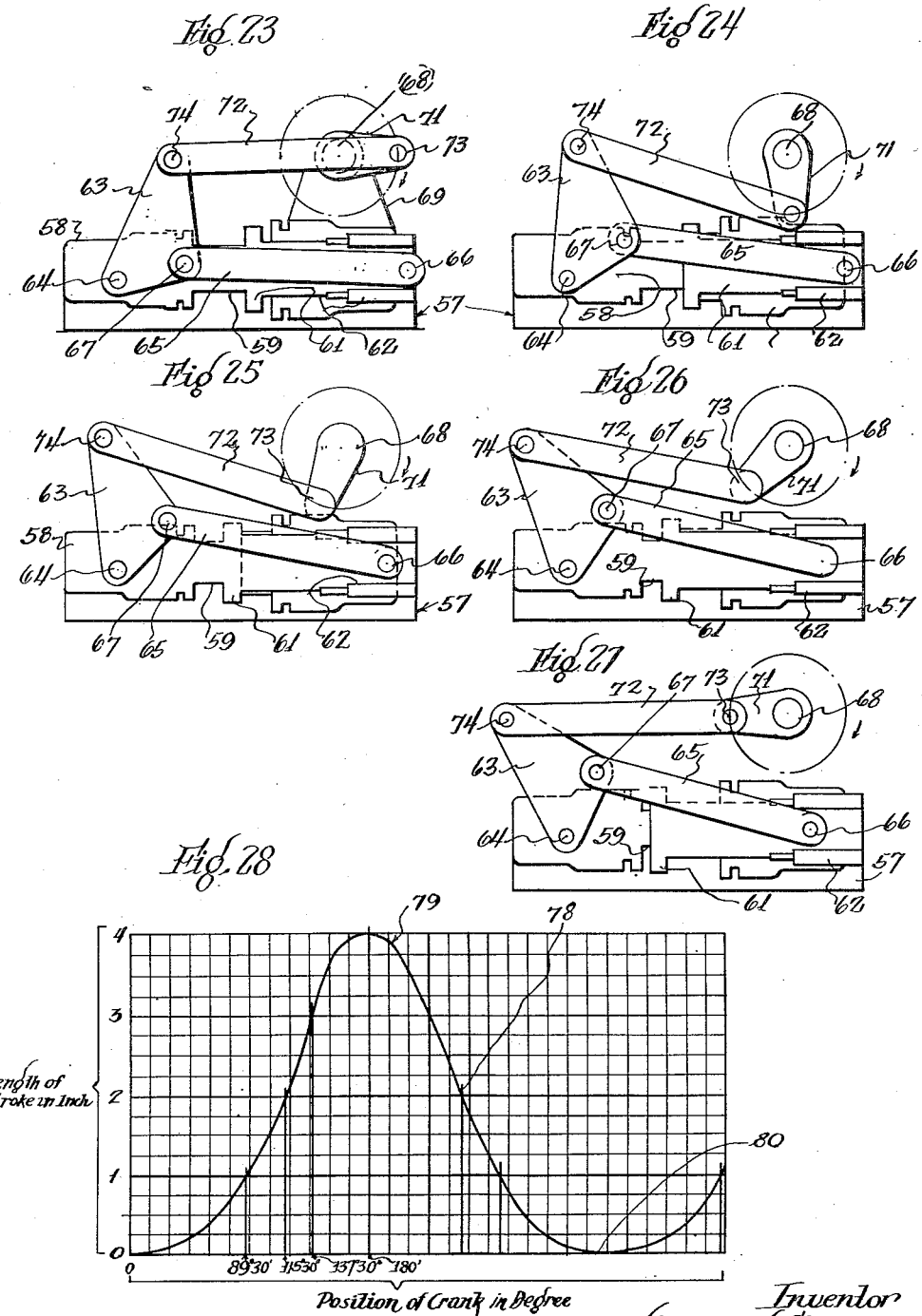

May 31, 1932.  W. W. SLOANE  1,861,194
POWER SHOVEL
Filed Aug. 19, 1927   22 Sheets-Sheet 14
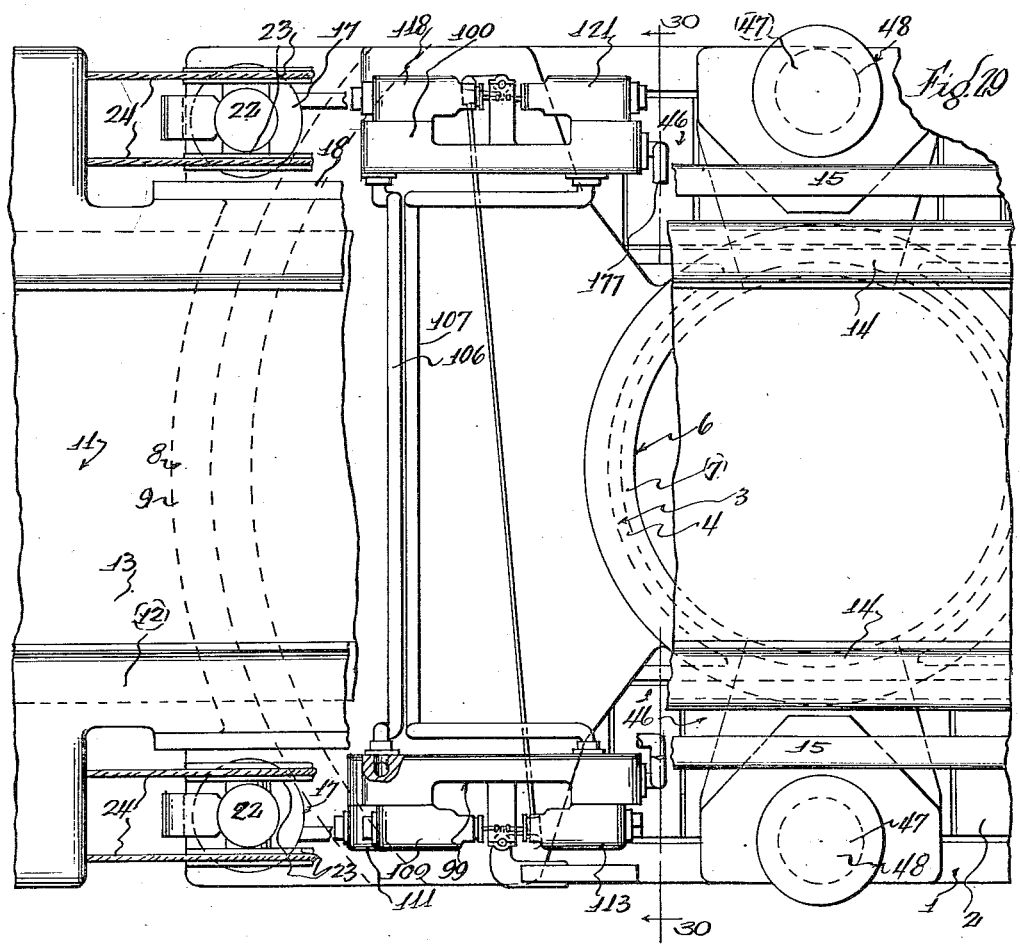
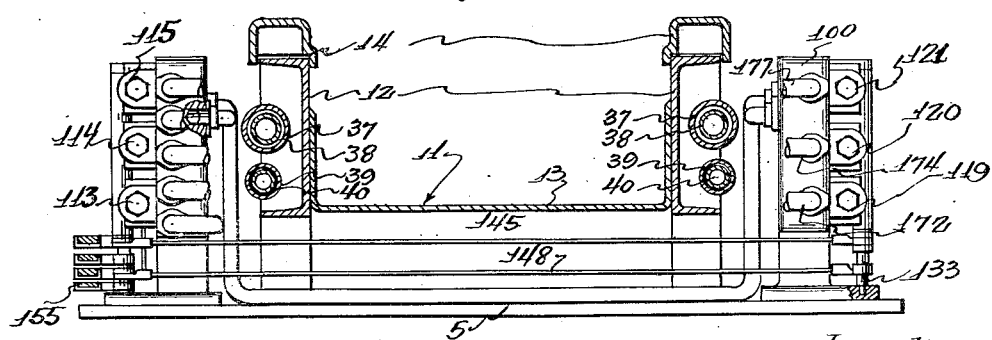

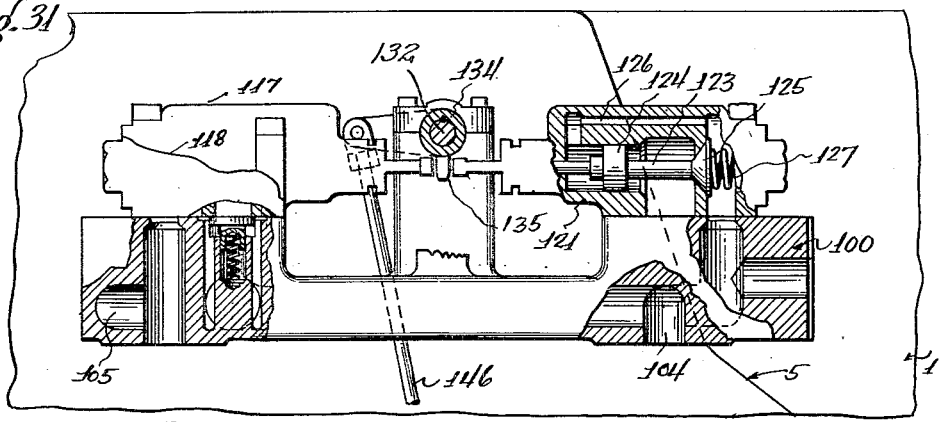
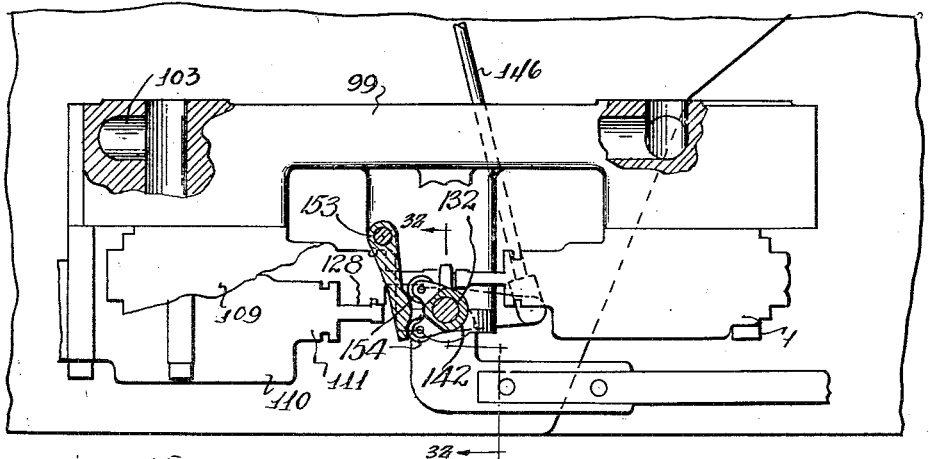
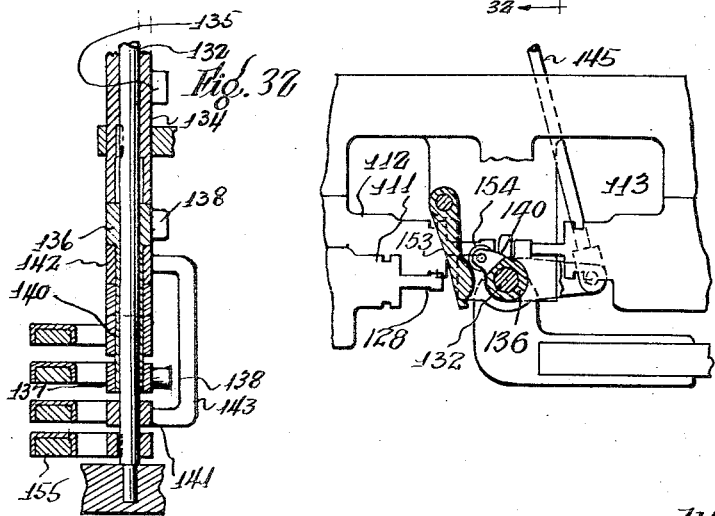

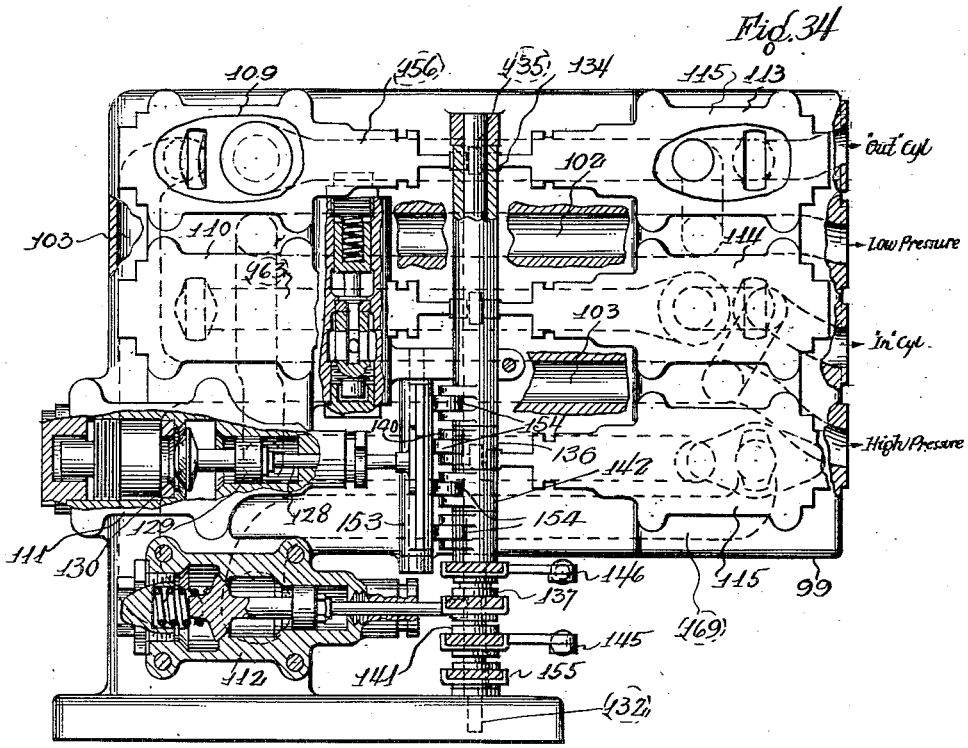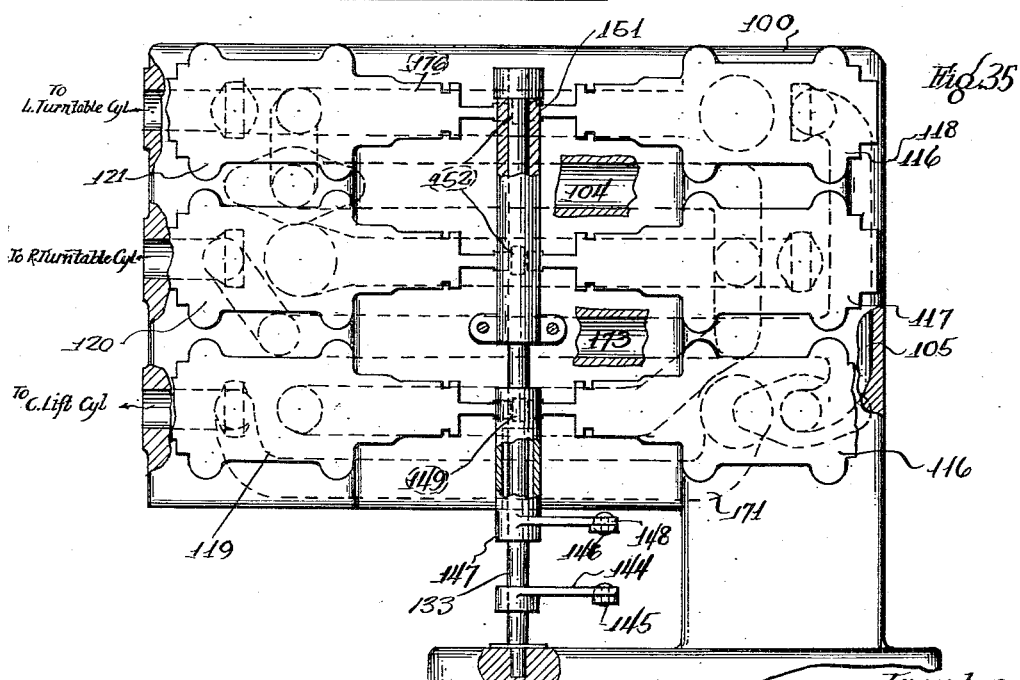

May 31, 1932.   W. W. SLOANE   1,861,194
POWER SHOVEL
Filed Aug. 19, 1927   22 Sheets-Sheet 17
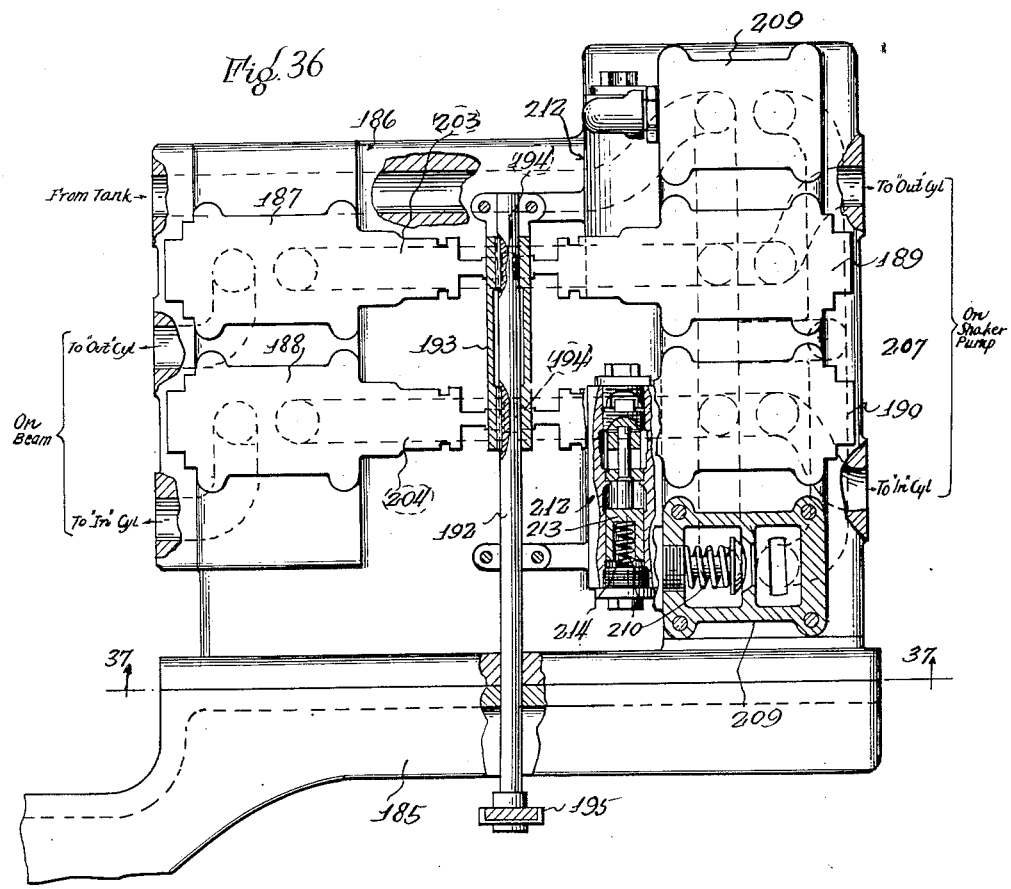
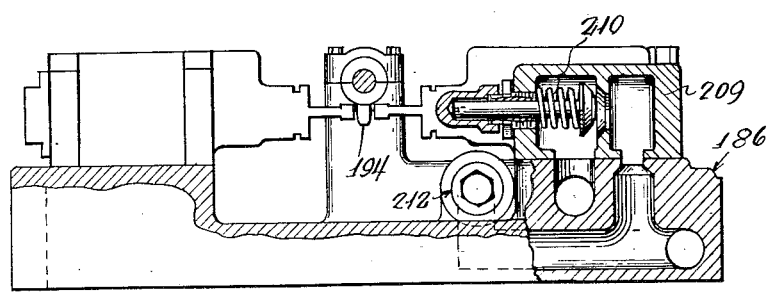

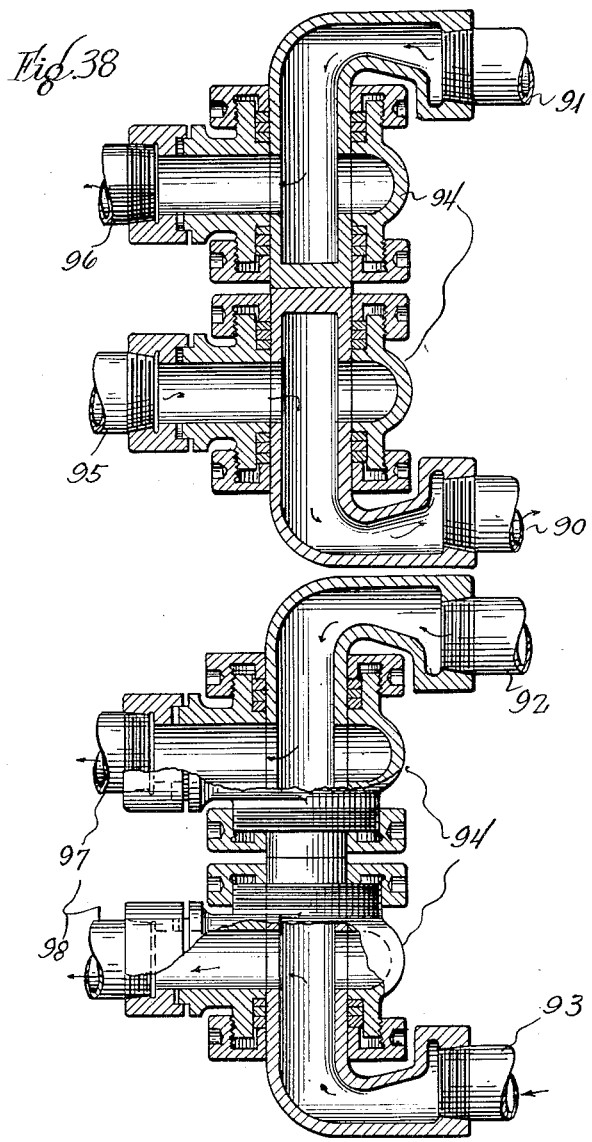

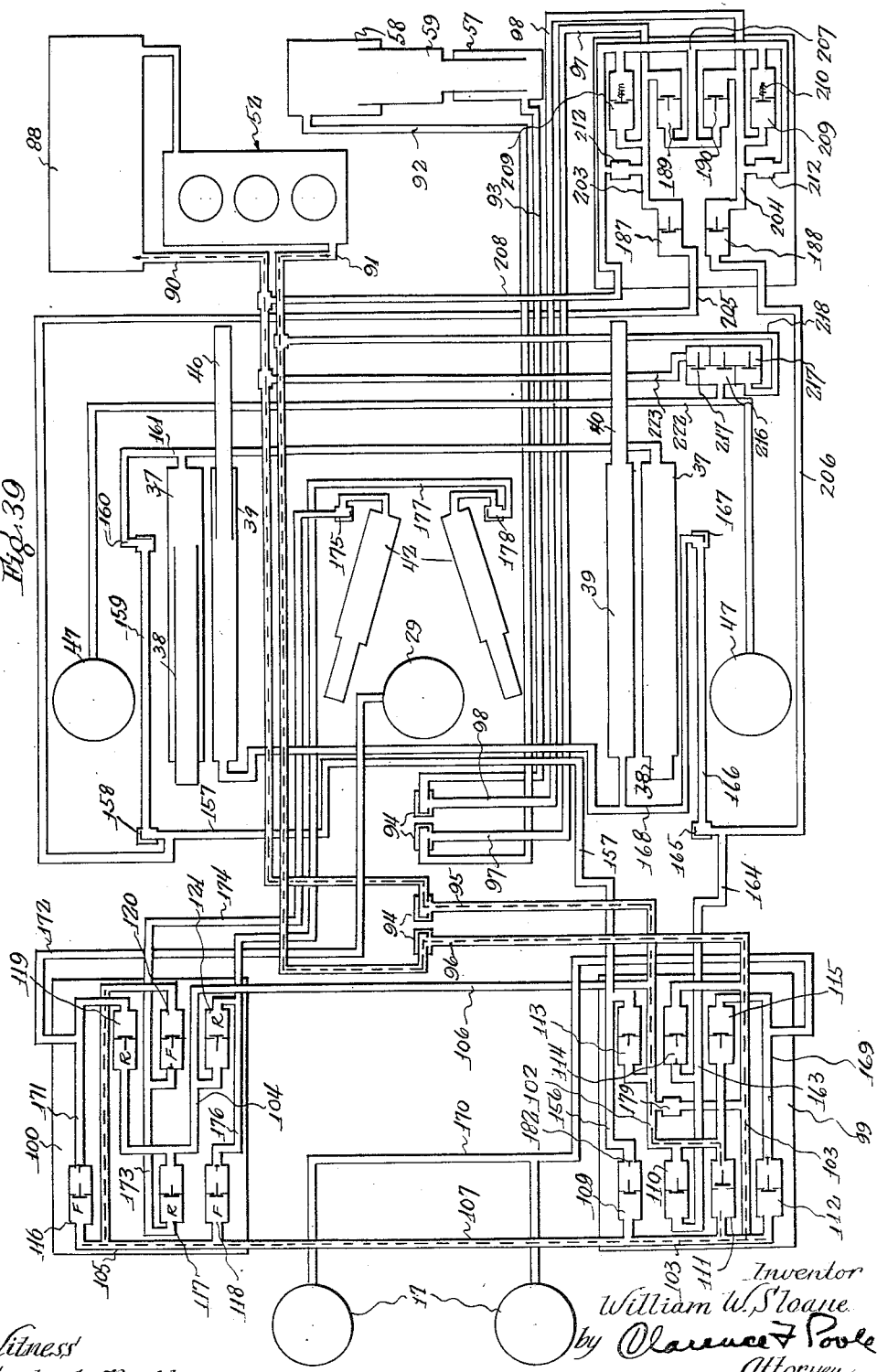

May 31, 1932.  W. W. SLOANE  1,861,194
POWER SHOVEL
Filed Aug. 19, 1927   22 Sheets-Sheet 20
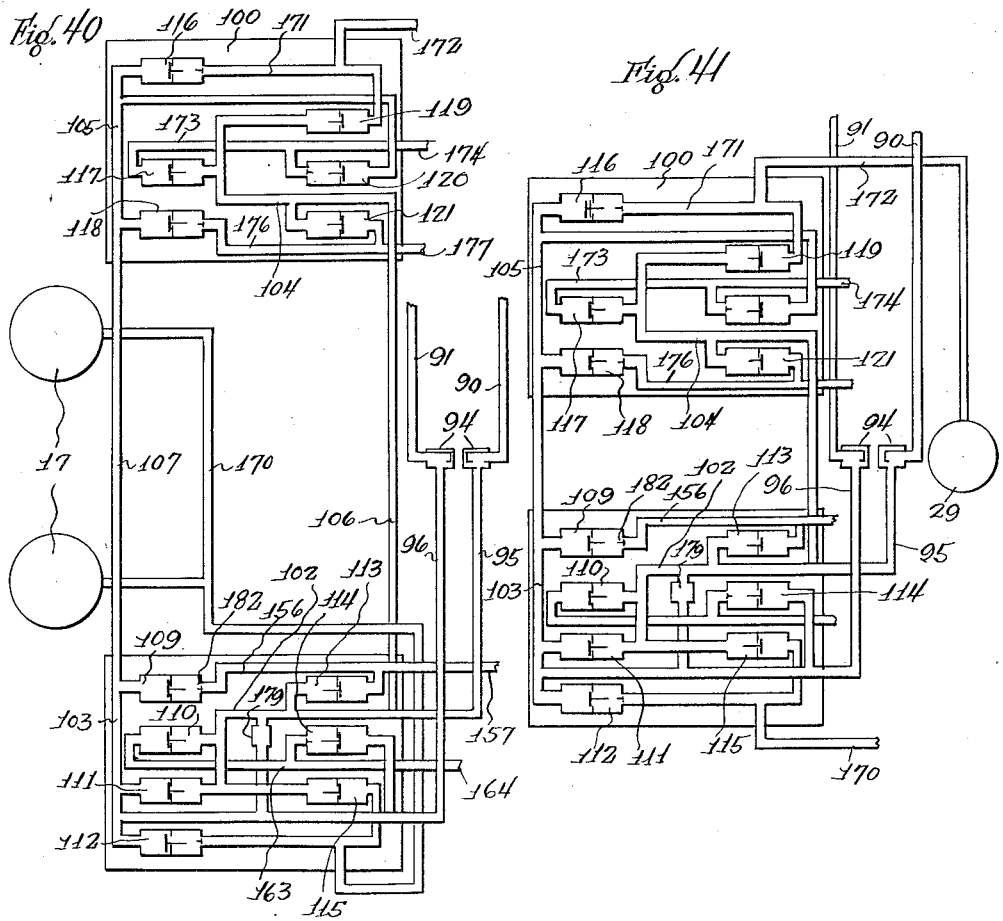
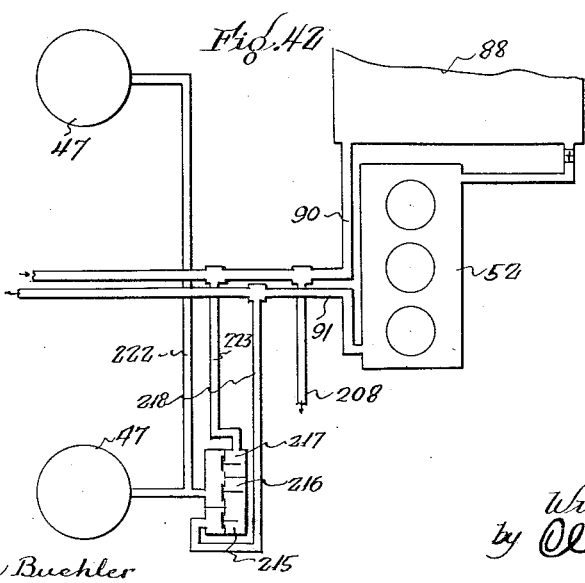
Witness
Herbert Buchler
Inventor
William W. Sloane
by Clarence J. Poole
Attorney May 31, 1932.  W. W. SLOANE  1,861,194
POWER SHOVEL
Filed Aug. 19, 1927   22 Sheets-Sheet 21
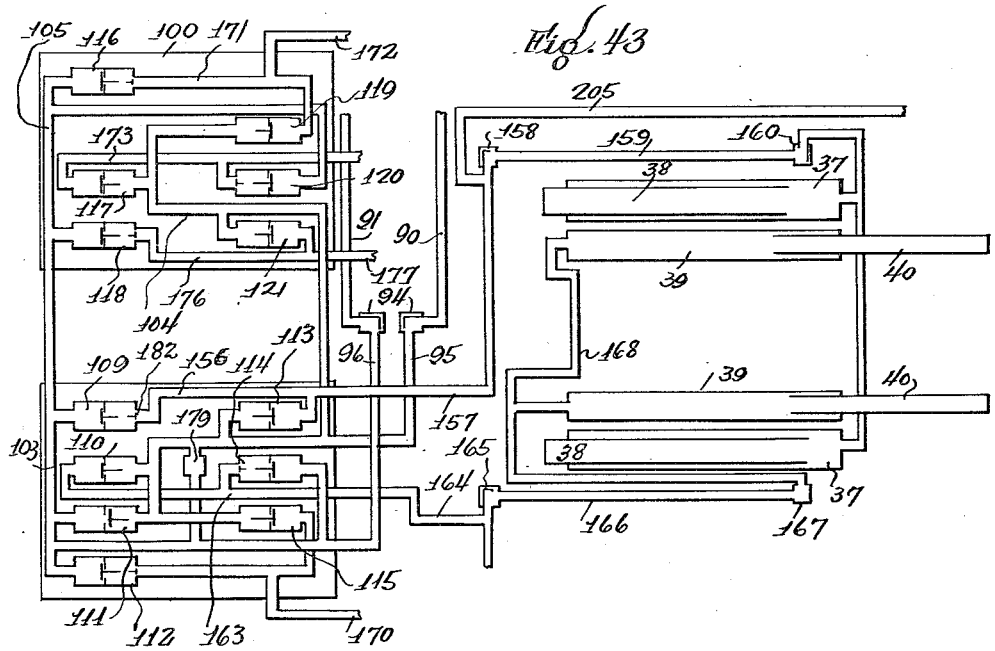
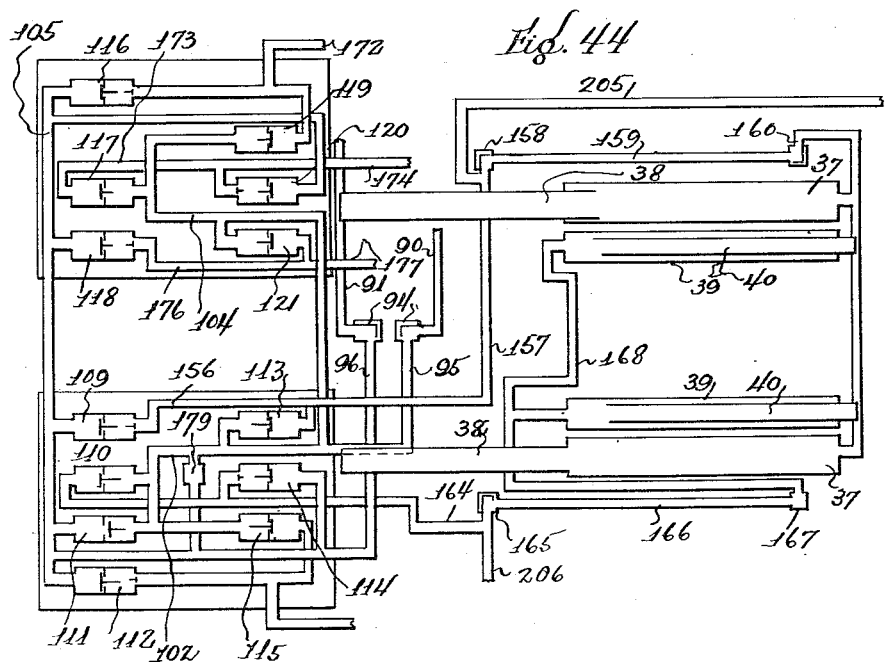
Witness
Herbert Buchler
Inventor
William W. Sloane
by Clarence F. Poole
Attorney

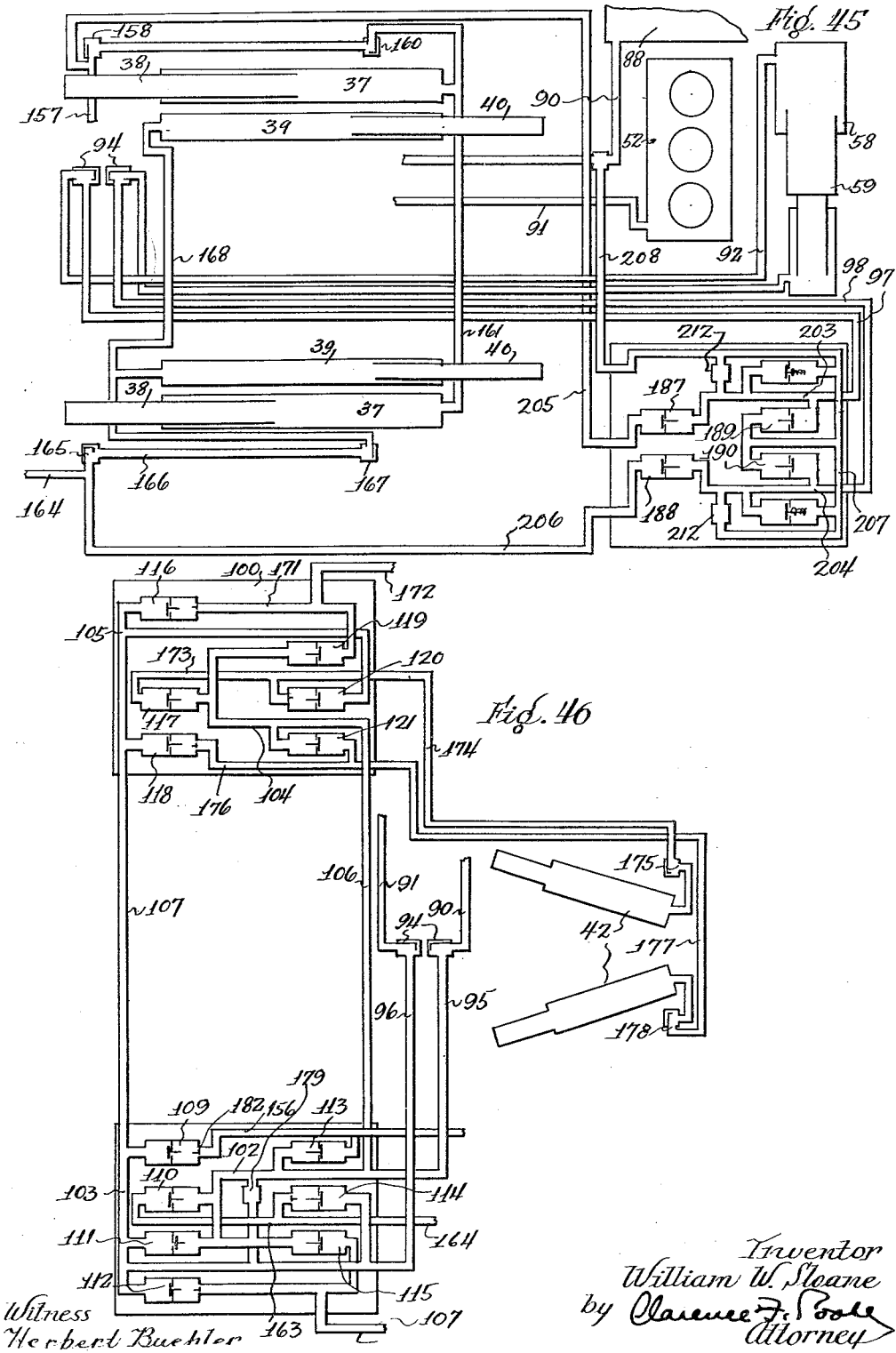

Patented May 31, 1932

1,861,194

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

POWER SHOVEL

Application filed August 19, 1927. Serial No. 214,027.

My invention relates particularly to power shovels adapted to operate in confined spaces, such as are encountered in mines, although not limited to this use alone.

The general objects of the invention reside in the provision of a power shovel which is adapted to efficiently scoop and discharge material in confined spaces, such as are encountered in mines, all with a view toward compactness, convenience, adaptability, high production and general all-around efficiency.

With these objects in view, my invention consists in certain features of novelty in the construction, combination and arrangement of parts by which the said objects and certain other objects, hereinafter appearing, are effected, all as fully described with reference to the accompanying drawings and more particularly pointed out in the appended claims.

In the said drawings:

Figure 1 is a plan view of a power shovel embodying my invention;

Figure 2 is a central longitudinal vertical section of the same;

Figure 3 is an enlarged section substantially on the line 3—3 of Figure 1;

Figure 4 is an enlarged section substantially on the line 4—4 of Figure 1;

Figure 5 is an enlarged section substantially on the line 5—5 of Figure 1;

Figure 6 is an enlarged section substantially on the line 6—6 of Figure 1;

Figure 7 is an enlarged partial section substantially on the line 7—7 of Figure 15, hereinafter described;

Figure 8 and Figure 9 are complementary partial sectional views substantially on the line 8—8 of Figure 1;

Figure 10 is a top plan view of the rear portion of the conveyor chute hereinafter described;

Figure 11 is a partial sectional view on the line 11—11 of Figure 10;

Figure 12 is a partial sectional view on the line 12—12 of Figure 10;

Figure 15 is a top plan view similar to Figure 13 with parts removed and in section;

Figure 16 is a partial rear elevation of the machine with parts in section and omitted;

Figures 17, 18 and 19 are diagrammatic side elevations of the machine showing parts thereof in different positions;

Figure 20 is a top plan view of the slushing pump, hereinafter described, with parts broken away and in section;

Figure 21 is a sectional view on the line 21—21 of Figure 20;

Figure 22 is a sectional view on the line 22—22 of Figure 21;

Figure 13:
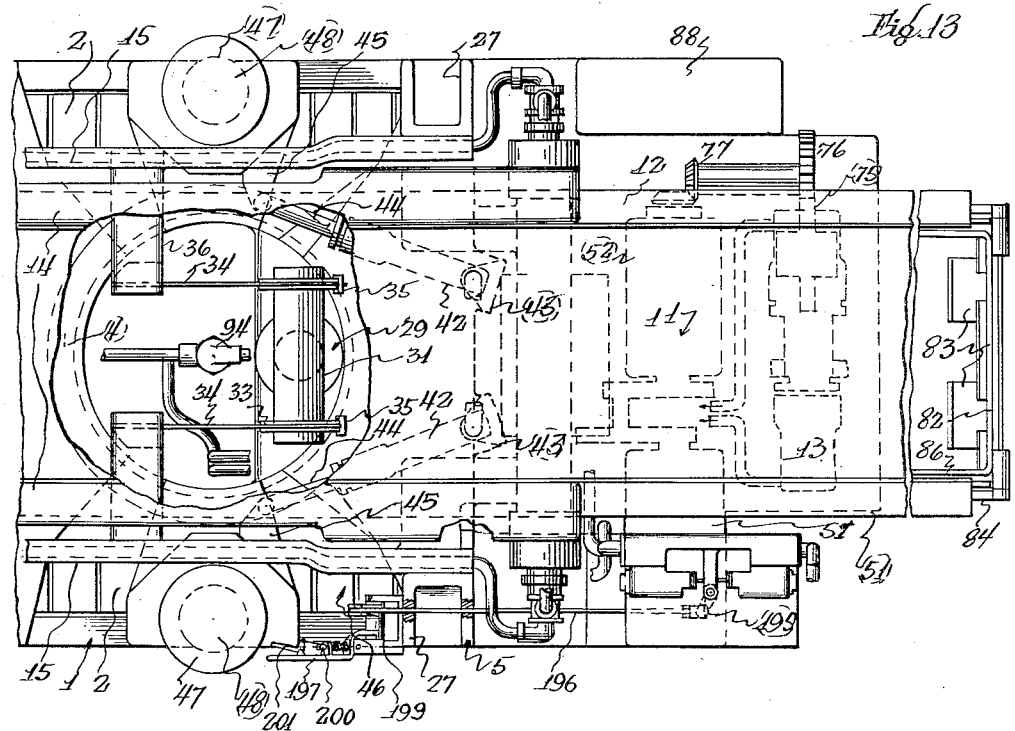
Figure 13 is a partial top plan view of the machine with parts broken away.

Figures 23 to 27 inclusive are diagrammatic side elevations of the slushing pump showing the operating parts thereof in different position;

Figure 28 is a graph of the fluid pressure action effected by the slushing pump;

Figure 29 is a partial top plan view of the machine with parts broken away;

Figure 30 is a partial sectional view on the line 30—30 of Figure 29;

Figure 31 is an enlarged top plan view of the valve mechanism shown in Figure 29 with parts broken away and in section;

Figure 32 is a partial section on the line 32—32 of Figure 31;

Figure 33 is a partial view similar to Figure 31 with parts broken away and in section at a different point;

Figure 34 is a side elevation of one bank of valves shown in Figure 31 with parts broken away and in section;

Figure 35 is an opposite side elevation of the other bank of valves shown in Figure 31 with parts broken away and in section;

Figure 36 is a side elevation of the slushing pump control valve mechanism hereinafter described, with parts broken away and in section;

Figure 37 is a view on the line 37—37 of Figure 36 with parts broken away and in section;

Figure 38 is a vertical section of certain of the swivel pipe joints, hereinafter described, of the machine;

Figure 39 is a diagrammatic view of the hydraulic system of the machine; and

Figures 40 to 46 inclusive are diagrammatic views of portions of this hydraulic system.

Like characters of reference indicate like parts in the several views.

Referring to the drawings, 1 designates a base frame which is mounted for propulsion on suitable laterally spaced continuous tread mechanisms 2. The base frame 1 is provided with a central vertical bore 3 therethrough between said continuous tread mechanisms and is also provided with a central vertical bored hub 4 extending said bore. See Figures 1, 2 and 3. A turntable 5 is arranged above this base and is provided with a central vertical bore 6 therethrough. The turntable is also provided with a central vertical bored hub 7 projecting downwardly therefrom and extending the bore 6 of the turntable, and this hub 7 is journaled in the bore 3 of the base for angular movement of the turntable in a horizontal plane with respect to the base, the turntable also engaging downwardly upon the upper end of the hub 4, and upon the front end of the base, as designated at 8 in Figure 2, for such angular movement of the turntable with respect to the base, and the turntable being provided with a hold down bracket 9 at its front end engaging underneath the front end of the base for preventing upward movement of the turntable with respect to the base.

Extending over the turntable 5 in central relation therewith is a conveyor chute beam structure, generally indicated at 11, and this chute is carried on the turntable for longitudinal thrusting and selective angular and bodily vertical movement throughout a range of generally horizontal positions with respect to the turntable in the following manner.

The conveyor chute beam structure 11 comprises a pair of parallel channel beam members 12 of U-shaped section arranged with the channels thereof facing outwardly in a common horizontal plane and a conveyor chute structure 13 extending between said beam members and longitudinally thereof and secured thereto. See Figures 1 to 6 inclusive. A pair of parallel arms 14 are disposed on the outsides of the beam members 12 and extend longitudinally of these beam members and carry the same for longitudinal movement with respect thereto. These arms 14 form an arm structure and are pivoted at their rear ends, on a horizontal axis transverse to the conveyor chute and disposed below the same, to the rear ends of a second pair of similarly extending parallel arms 15, disposed on the outsides of the arms 14, by means of a transverse shaft 16. See Figures 1, 2 and 6. The arms 15 form a second arm structure and are pivotally carried at their forward ends on the turntable 5 in the following manner. See Figures 1, 2 and 5. Fixed on the forward end of the turntable 5 and disposed on opposite sides of the arms 14 and the chute 11 is a pair of vertical fluid pressure cylinders 17, and formed with these cylinders and extending upwardly therefrom at the rear of the same are extensions 18 upon the upper ends of which the forward ends of the arms 15 are pivotally mounted, as designated at 19, on a horizontal axis transverse to the chute 11 and accordingly parallel to the pivotal axis of the arms 14. The inner portions of the extensions 18 extend on the insides of the cylinders 17 and have the inner vertical surfaces thereof slidably engaged by the forward portions of the arms 14 for laterally guiding the same.

The conveyor chute beam structure 11 is provided at its front end with a forwardly facing scoop 21 which continues the chute structure thereof and accordingly communicates therewith for purposes hereinafter described.

As carried on the turntable 5 by the pivoted arm structures, comprising the arms 14 and the arms 15, the conveyor chute beam structure 11 is carried for longitudinal thrusting movement and for selective angular and bodily vertical movement throughout a range of generally horizontal positions, the chute beam structure being angularly movable in a horizontal plane with the turntable. Vertical movement of the chute 11 and its scoop 21 is effected in the following manner. The hereinbefore mentioned forwardly disposed vertical fluid pressure cylinders 17, disposed on opposite sides of the arms 14 and the chute 11, have plungers 22 therein which extend upwardly therefrom. Mounted on the upper ends of each of these plungers is a pair of revoluble sheaves 23 disposed on a horizontal transverse axis. See Figures 1, 2 and 5. Cables 24 have their ends secured to the rear sides of respective of the cylinders 17, as designated at 25 in Figure 2, and have the intermediate portions of the stretches thereof trained over respective of the pairs of sheaves 23 and have the terminal loops thereof engaged in groove formations 26, as shown in Figure 4, formed on the undersides of respective of the arms 14 at the forward ends thereof. Thus are provided multiplying movement means by means of which fluid pressure in the cylinders 17 effects upward pivotal movement of the arms 14 and with them the chute 11 and scoop 21. The weight on the arms 14 effects downward movement thereof when the fluid pressure in the cylinders 17 is released.

The vertical angular movement of the chute beam structure 11 is preferably effected by this pivotal movement of the arms 14 as effected by means of the cylinder 17, and in order that the arms 15 may not be operated during this pivotal operation of the arms 14 the following is provided. Fixed on the rearward end of the turntable 5 and disposed on opposite sides of the arms 15 is a pair of vertical standards 27 which serve as guides for the rearward ends of these arms. See Figures 1 and 6. Manually removable pins 28 are engaged in registered horizontal transverse bores through these standards and the rear ends of the arms 15 for releasably securing the arms 15 against pivotal movement with respect to the turntable, these pins preferably, as shown, releasably locking the arms 15 in a lower pivotal position thereof.

The arms 15 pivoting in cooperation with pivoting of the arms 14 effect bodily vertical movement of the chute beam structure, the pins 28 being withdrawn from engagement with the arms 15 for this purpose, and the arms 15 are operated in the following manner. See Figures 2 and 3. Secured with the turntable 5 and extending downwardly into the bore 6 of the turntable is an upwardly facing vertically disposed fluid pressure cylinder 29. This cylinder is disposed rearwardly of the cylinders 17 and beneath the chute beam structure 11, and is provided with a plunger 31 extending upwardly therefrom. The plunger 31 is provided at its upper end with sheaves 33 disposed in spaced relation on opposite sides of the cylinder 29 and on a horizontal axis transverse to the chute 11. Cables 34 have ends thereof secured with the cylinder 29, as designated at 35 in Figure 3, and have the intermediate portions thereof trained over the sheaves 33 and have their other ends secured to the lower ends of downwardly projecting extensions 36 formed on the intermediate portions of the arms 15. Thus is provided a multiplying movement means by means of which fluid pressure in the cylinder 29 effects upward pivotal movement of the arms 15. The weight on the arms 15 effects downward movement thereof when the fluid pressure in the cylinder 29 is released.

Obviously the space provided by the bore 6 of the turntable 5 is accessible from above and provides space below the normal horizontal plane of the turntable. As above stated, the cylinder 29 projects downwardly into the space so provided, and likewise do the extensions 36 when the arms 15 are in their lower positions. This arrangement permits the height of the machine to be lower than would otherwise be the case which is advantageous in underground work.

The conveyor chute beam structure 11 is operated longitudinally with respect to the arms 14 in the following manner. See Figures 3, 4, 5, 6, 8 and 9. Space is provided between the arms 14 and the channel beam members 12 of the conveyor chute beam structure 11 by reason of the fact that the channels of the members 12 face outwardly in a common horizontal plane as hereinbefore described. A pair of fluid pressure cylinders 37 extend longitudinally of said chute 11 and are disposed between the arms 14 and the respective beam members 12 and occupy space provided by the channels of these beam members. These cylinders 37 are secured with the arms 14 in a suitable manner and are provided with plungers 38 extending forwardly therefrom and having the forward ends thereof secured with the beam members 12. Fluid pressure in the cylinders 37 effects forward movement of the chute 11 and they are accordingly termed out cylinders. A second pair of fluid pressure cylinders 39 extend longitudinally of the chute 11 and are disposed between the arms 14 and the respective beam members 12 and occupy space provided by the channels of these beam members. These cylinders 39 are secured with the arms 14 in a suitable manner and are provided with plungers 40 extending rearwardly therefrom and having the rearward ends thereof secured with the beam members 12. Fluid pressure in the cylinders 39 effects rearward movement of the chute and they are accordingly termed in cylinders.

The turntable is operated angularly with respect to the base in the following manner. See Figures 2, 7 and 15. Two fluid pressure cylinders 42 are mounted at the closed ends thereof for pivotal movement in a horizontal plane by means of two pivot brackets 43 fixed on the rear end of the turntable 5. These cylinders extend forwardly and outwardly in opposite directions from said pivot brackets 43 and are provided with plungers 44 extending outwardly from the forward ends of these cylinders. The outer ends of the plungers 44 are pivotally connected with the base 1 at opposite sides thereof and on vertical axes disposed in diametrically opposite relation with the turntable 5 by means of pivot brackets 45, the turntable being provided with diametrically opposite side openings 46 vertically therethrough to accommodate for the pivot brackets 45 and for another purpose hereinafter described. As so arranged fluid pressure in either of the cylinders 42 effects turning of the turntable with respect to the base in the corresponding direction whereby turning of the turntable is effected.

In order that the base may be secured in position where an elevated downwardly facing support, such as the roof in a mine, is available, a pair of upwardly facing vertical fluid pressure cylinders 47 are fixed on the base 1 and extend upwardly therefrom on opposite sides thereof and in diametrically opposite relation with the turntable and through said openings 46 of the turntable. These cylinders are provided with plungers 48 which are engaged upwardly against an elevated downwardly facing support, such as a mine roof, by fluid pressure in the cylinders 47 to exert downward pressure for securing the machine in position. The openings 46 of the turntable provide clearance for the above described holding jacks and are of sufficient extent angularly of the turntable to permit sufficient angular movement of the turntable with respect to the base. It will be observed that the aforementioned holding jacks are disposed on opposite sides of the chute beam structure 11, so that the chute is not interferred with by the jacks, and that by reason of the fact that the jacks extend upwardly through the openings 46 of the turntable, the width of the machine is not increased thereby.

Fluid pressure in the cylinders hereinabove described is controlled by manually controlled valve means, hereinafter described, so that the various functions of these cylinders are selectively controlled, and the conveyor chute beam structure 11 acts as a shovel beam for the operative movement of the scoop 21. Various positions of the chute beam structure 11 and related parts are shown in Figures 17, 18 and 19, and it will be observed that by reason of the selective vertical angular and bodily movements of the chute 11, the scope of operation of the scoop 21 is increased in that the machine is capable of projecting the scoop horizontally throughout a considerable height range. Thus the scoop 21 may be operated in an elevated space limited vertically, as in the limited space between the roof of a mine and an elevated shelf thereof, by reason of the fact that the beam or chute 11 may be positioned in substantial alinement with the plane of such space, with the result that the scoop and beam operate longitudinally in substantial alinement with the horizontal plane of such space. Figure 19 shows the position of the parts of the machine to meet a condition as just described. In this figure the arm structure comprising the arms 15 is in an upper angular position and the arm structure comprising the arms 14 is in an upper bodily and an intermediate or horizontal angular position, with the result that the chute or beam structure 11 is disposed horizontally in an upper position. Figure 17 shows the chute or beam structure 11 positioned in the lower horizontal position thereof and in which the arms 14 are in their lower bodily and intermediate or horizontal angular position and the arms 15 are in their lower angular position. Figure 18 shows the chute or beam structure 11 inclined downwardly for operating at a floor position and in which the arms 14 are in their lower and downwardly inclined angular position and the arms 15 are in their lower angular position.

Figure 14:
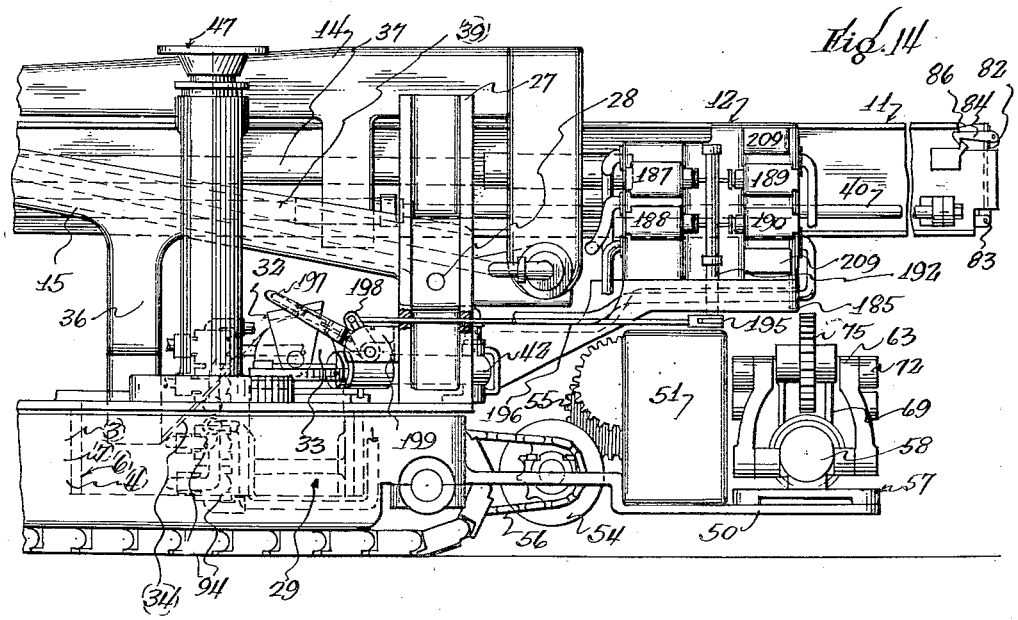
Figure 14 is a partial side elevation of the machine.

The base 1 extends rearwardly beyond the turntable 5, as designated at 50. See Figures 2, 14 and 15. Mounted on this extension 50 and disposed at one side thereof on a transverse axis is a prime mover in the form of an electric motor 51. Also mounted on the extension and disposed inwardly of the motor in substantial axial alinement therewith is a fluid pressure pump 52 which is driven from the motor by means of reduction gearing 53 connected with the adjacent ends of the pump and motor shafts.

A transversely disposed manually controlled planetary transmission and brake device 54 is mounted on the extension 50 and is driven from the shaft of the pump 52 through reduction gearing 55. The transmission device 54 is operatively connected with the continuous tread devices 2 by means of chain and sprocket driving devices 56.

Operation of the scoop 21 to scoop material thereon is obvious, and means is provided for discharging material therefrom. Preferably this means includes the conveyor chute beam structure 11, it being for the purpose of providing such a discharging means that the structure 11, which constitutes a scoop beam structure, is constructed in the form of a conveyor chute with which the scoop 21 communicates. In order to effect rearward movement of material on the conveyor chute 11 for discharge the chute is vibrated longitudinally in the following manner. See Figures 15, 16 and 20 to 28, inclusive. Mounted on the extreme rear end of the extension 50 of the base 1 is a double acting reciprocating slushing pump comprising as follows. A frame 57 is provided with alined opposing fluid pressure cylinders 58 and engaged in both of these cylinders for reciprocation is a plunger 59. A U-shaped yoke 61 has the intermediate portion thereof secured with the intermediate portion of the plunger 59 between the cylinders 58 and has the legs thereof extending in parallelism with this plunger and engaged for sliding movement in parallelism with the plunger on slides 62 formed on one of these cylinders. A pair of pivoted crank members 63 are pivoted coaxially at 64 on opposite sides of the other of these cylinders on a horizontal axis corresponding with the plane of the yoke 61 and normal to the axis of the cylinders 58. A pair of links 65 are pivotally connected at ends thereof, as designated at 66, to the outer ends of the legs of the yoke 61 on an axis parallel to the pivotal axis of the crank members 63, and are pivotally connected at their other ends, as designated at 67, to the crank members 63 on an axis parallel to the pivotal axis of these crank members and disposed radially of this pivotal axis, whereby oscillation of the crank members 63 effects reciprocation of the plunger 59. A shaft 68 is journaled above the cylinder 58, upon which are formed the slides 62, on an axis disposed in parallelism with that of the crank members 63, by means of spaced bearing extensions 69 on this cylinder. Secured on the shaft 68 outwardly of these extensions is a pair of parallel cranks 71, and a second pair of links 72 are pivotally connected at ends thereof, as designated at 73, to the outer ends of the cranks 71 on an axis parallel to the axes of the shaft 68 and that of the crank members 63, and are pivotally connected at their other ends, as designated at 74, to the crank members 63 on an axis parallel to the pivotal axis of these crank members and disposed radially of this pivotal axis and spaced from the pivotal connection 67, whereby oscillation of the crank members 63 is effected by rotation of the shaft 68.

The axis of the cylinders 58 is disposed in parallelism with the shaft of the fluid pressure pump 52 and is driven from the shaft of the pump 52 in the following manner. See Figures 15 and 16. A spur gear 75 is secured on the shaft 68 between the bearing extensions 69, and meshing with this gear is a second spur gear 76. The gear 76 is driven from the shaft of the pump 52 by means of a pair of meshed bevel gears 77, one of which is secured on the adjacent end of the shaft of the pump 52 and the other of which is secured with the gear 76 in coaxial relation therewith.

The hereinbefore described cylinders 37 and 39 and their plungers 38 and 40 constitute double acting fluid pressure means for longitudinally reciprocating the conveyor chute beam structure 11, and in order to effect longitudinal vibration of this chute structure 11 to effect the movement of material rearwardly thereon for discharge, the cylinders 58 are communicated with respective of the cylinders 37 and 39 to alternate fluid pressure therein as hereinafter described. It will be observed that the out cylinders 37 have a greater diameter than that of the in cylinders 39 in order that sufficient power may be available for driving the scoop 21 into material to be scooped, and it is because of the difference in diameter of the in and out cylinders 37 that the cylinders 58 of the slushing pump vary correspondingly in diameter, the larger slushing pump cylinder being communicated with the out cylinders 37 and the smaller slushing pump cylinder being communicated with the in cylinders 39.

In order to effect the aforementioned vibration of the chute 11 in a manner to effect rearward movement of material thereon the plunger 59 of the slushing pump is given a quicker reversal at one end than at the other end of the movement thereof, that is a quicker reversal is given to the plunger 59 at the end of the movement thereof corresponding with the rear reversal of the chute 11 than at the other end thereof. This is effected by arranging the linkage, comprising the links 72, the crank members 63 and the links 65, so that the range of movement of the pivotal connection 67 between the crank members 63 and the links 65 is disposed nearer a dead center of this connection than is the range of movement of the pivotal connection 74 between the crank members 63 and the links 72 disposed with respect to a dead center of this last mentioned pivotal connection. See Figures 23 to 27 inclusive, which show the slushing pump mechanism in different positions in the cycle of movement thereof. As shown the range of movement of the pivotal connection 67 is disposed adjacent a dead center thereof and the range of movement of the pivotal connection 74 is disposed midway between the dead centers of this pivotal connection. As a result the fluid pressure effected in the out and in cylinders 37 and 39 by the slushing pump is alternated in the manner shown in Figure 28 in which the line 78 represents the movement of the plunger 59 of the slushing pump and accordingly the alternation of the pressure effected in the out and in cylinders 37 and 39 and the vibratory movement of the chute 11. It will be observed that the reversal indicated at 79 on the line 78 of Figure 28, which corresponds with the rear reversal of the vibratory movement of the chute 11, is considerably quicker than that indicated at 80 which corresponds with the front reversal of the vibratory movement of the chute 11.

The preferred manner of operating the machine is as follows. See Figures 17, 18 and 19. The chute beam structure is operated to scoop material. Then the material is moved rearwardly from the scoop 21 on to the chute proper by longitudinally vibrating the chute, preferably while it is in a horizontal position, preparatory to scooping additional material. This is repeated until the entire length of the chute contains material scooped during a plurality of scooping operations. Then the rear end of the chute 11 is positioned for discharge as by positioning it over an empty mine car to be loaded, and preferably with the chute in a horizontal position, and finally the material on the chute is discharged from the rear end of the chute by longitudinally vibrating it as hereinbefore described. After this the sequence of operations just described is repeated.

The bodily vertical movement of the chute 11 is advantageous in discharging as well as in scooping for it may be positioned in a lower horizontal position, as shown in Figure 17, for loading a low mine car or it may be positioned in an upper horizontal position, as shown in Figure 19, for loading a high mine car.

In order that the material on the chute 11 may not be discharged except when desired, a gate 82 is pivoted on a transverse axis to the bottom of the chute structure 13 at the rear end thereof by means of a hinge structure 83, and is releasably secured in a vertical upwardly extending position to block the discharge of material from the rear end of the chute 11 by means of manually releasable spring pressed latch devices 84 at the sides of the outer end of the gate and engaging detents 85 secured on the rear ends of the beam members 12. See Figures 2, 10, 11 and 12. The hinge structure 83 is provided with stops 86 engageable upwardly against the bottom of the chute structure 13 when the gate is in open position, and the gate is provided with quadrant shaped side portions 87 whereby to continue the bottom and sides of the chute 11 when the gate is in open position.

Communication of the pressure pump and the slushing pump with the various fluid pressure actuated devices of the machine is effected through a pipe and manually controlled valve system which will now be described.

It will be observed that both the pressure and slushing pumps are mounted on the base 1 and that the fluid pressure actuated devices, with the exception of the holding jacks, are carried with the turntable 5. A reservoir tank 88 is carried on the rearward extension 50 of the base 1 and pipes 90, 91, 92 and 93, carried with the base, lead respectively from the tank 88, the pressure side of the pump 52, and the cylinders 58 of the slushing pump to swivel joints 94 disposed coaxially with the turntable 5 and in the space provided by the concentric bore 6 through the turntable. See Figures 2, 38 and 39. From these swivel joints 94 pipes 95, 96, 97 and 98, carried with the turntable, lead to manually actuated valve mechanisms carried on the turntable and by means of which the operation of the machine is controlled.

Mounted on the forward portion of the turntable 5 and disposed on opposite sides of the chute beam structure 11 and below the arms 15 immediately to the rear of the forward lifting cylinders 17, are two valve manifolds 99 and 100 arranged vertically in forwardly and rearwardly extending planes. See Figures 29 and 30. The pipes 95 and 96 lead respectively to closed passages 102 and 103 in the manifold 99, and these passages are in turn connected with the corresponding closed passages 104 and 105 in the manifold 100 by means of pipes 106 and 107. See Figures 29, 30, 34, 35 and 39.

Secured against the outer face of the manifold 99 are seven poppet valves 109, 110, 111, 112, 113, 114 and 115, and secured against the outer face of the manifold 100 are six poppet valves 116, 117, 118, 119, 120, 121. See Figures 29, 30, 31, 34, 35 and 39. These valves with the exception of valve 111 are similar in construction, each comprising a stem 123, a piston 124, spaced longitudinally from the head 125 of the valve below the same, and having a by-pass 126 in the body of the valve communicating the upper side of the head with the lower side of the piston to balance the pressure on the upper side of the valve head, a spring 127 being provided to move the valve head into closed position with a relatively light unvarying pressure. See Figures 31 and 34. The valve 111 comprises a stem 128, and a piston 129, spaced longitudinally from the head 130 of the valve above the same and having a by-pass, not shown but similar to the by-pass 126 of the other control valves, in the body of the valve and communicating the lower side of the head with the upper side of the piston to partially balance the pressure on the lower side of the valve head. See Figure 34.

The valves on the manifolds 99 and 100 are arranged in vertical opposing banks, and all of these valves, with the exception of the valve 111, close in the direction of opposing banks of valves, while the valve 111 opens in the direction of the opposing bank. See Figures 31 to 35 inclusive. A pivotally mounted vertical shaft 132 is disposed on the outside of the manifold 99 intermediate the banks of valves on this manifold, and another pivotally mounted vertical shaft 133 is disposed on the outside of the manifold 100 intermediate the banks of valves on this manifold. A sleeve 134 is secured on the upper portion of the shaft 132 and is provided with parallel radial fingers 135 which are interposed respectively between the stems of the valves 109 and 113 and the stems of valves 110 and 114, so that with pivotal movement of the shaft 132 in one direction the valves 109 and 110 are opened and with pivotal movement of this shaft in the other direction the valves 113 and 114 are opened, these four valves being closed when the shaft 132 is in an intermediate pivotal position. See Figures 32 and 34. A sleeve 136 is pivotally mounted on the shaft 132 below the sleeve 134, and a hub 137 is secured on the lower end of this sleeve. The sleeve 136 and the hub 137 are provided with parallel radial fingers 138 respectively disposed in front of the outer ends of the valves 115 and 112, so that with pivotal movement of the sleeve 136 and the hub 137 in one direction the valve 112 is opened and with pivotal movement of this sleeve and hub in the opposite direction the valve 115 is opened, these valves being closed when this sleeve and hub are in an intermediate pivotal position.

An arm 140 is pivotally mounted on the sleeve 136 immediately above the hub 137, and a second arm 141 is pivotally mounted on the shaft 132 immediately below the hub 137 and is angularly secured with a hub 142, pivotally mounted on the sleeve 136 immediately above the arm 140, by means of a yoke 143. The arm 141 is connected with an arm 144 secured on the shaft 133 for pivotally operating the same by means of a connecting rod 145 extending between the manifolds 99 and 100 underneath the conveyor chute beam structure 11. See Figures 29, 30 and 35. The arm 140 is connected with an arm 146, fast on a sleeve 147 pivotally mounted on the shaft 133 for pivotally operating the same by means of a connecting rod 148 extending between the manifolds 99 and 100 underneath the conveyor chute beam structure 11. The sleeve 147 is provided with a radial finger 149 interposed between the stems of valves 116 and 119, so that with pivotal movement of the sleeve 147 in one direction the valve 116 is opened and with pivotal movement of this sleeve in the other direction the valve 119 is opened, these valves being closed when the sleeve 147 is in an intermediate pivotal position. A sleeve 151 is secured on the upper portion of the shaft 133 and is provided with parallel radial fingers 152 which are interposed respectively between the stems of valves 117 and 120 and the stems of valves 118 and 121, so that with pivotal movement of the shaft 133 in one direction the valves 117 and 118 are opened and with pivotal movement of this shaft in the other direction the valves 120 and 121 are opened, these four valves being closed when the shaft 133 is in an intermediate pivotal position.

A rocker member 153 is mounted on the manifold 99 for pivotal movement on an axis parallel with and disposed inwardly of the shaft 132 and is engageable against the stem 128 of the valve 111 for closing the same. See Figures 31 to 34 inclusive. A pair of rollers 154 are mounted radially on the sleeve 134 and a pair of rollers 154 are mounted radially on the hub 142, and each pair of these rollers are spaced angularly to effect closing of the valve 111 with opposite movements of the sleeve 134 and opposite movements of the hub 142. Single rollers 154 are mounted radially on the sleeve 136 and the arm 140 to effect closing of the valve 111 with movement of the sleeve 136 in the direction for opening the valve 112 and to effect closing of the valve 111 with movement of the arm 140 in the direction for opening the valve 116.

Manually operable handles 155 are secured on the arm 140, the hub 137, the arm 141 and the shaft 132 and extend therefrom in a rearward direction for the convenient manipulation of all of the valves on the manifolds 99 and 100 from one side of the machine, though the valves are disposed on opposite sides of the machine with a view toward compactness, convenience and utilization of space afforded by the general design of the machine.

The valves 109, 112, 114, 116, 118 and 120 are connected above the heads thereof with the high pressure pipe line, including the pipe 96, the manifold passages 103 and 105 and the pipe 107, while the valve 111 is connected below the head thereof with the manifold passage 103. See Figure 39. The valves 110, 113, 115, 117, 119 and 121 are connected below the heads thereof with the low pressure pipe line, including the pipe 95, the manifold passages 102 and 104 and the pipe 106, while the valve 111 is connected above the head thereof with the manifold passage 102.

The valve 109 is connected under the head thereof and the valve 113 is connected above the head thereof with a passage 156 in the manifold 99 which in turn is connected to a pipe 157 which leads to a swivel pipe joint 158 disposed coaxially with the pivotal axis of the arms 15 and adjacent one of the pivot mountings 19 thereof. See Figures 2, 5 and 39. A pipe 159 is carried with the adjacent arm 15 and extends between and is connected with the swivel pipe joint 158 and another swivel pipe joint 160 which is disposed coaxially with the pivotal axis of the arms 14 immediately outside of an end of the shaft 16. See Figures 2, 6, 39 and 44. A pipe 161 leads from the swivel joint 160 to the out cylinders 37. Thus, opening of the valve 109 communicates fluid pressure in the high pressure line with the out cylinders 37 to operate the chute beam structure 11 forwardly or outwardly and opening of the valve 113 releases fluid pressure in the out cylinders 37 to permit rearward or inward movement of the chute beam structure 11.

The valve 114 is connected under the head thereof and the valve 110 is connected above the head thereof with a passage 163 in the manifold 99 which in turn is connected to a pipe 164 which leads to a swivel pipe joint 165 disposed coaxially with the pivotal axis of the arms 15 and adjacent the other of the pivot mountings 19 thereof. See Figures 2, 5 and 39. A pipe 166 is carried with the adjacent arm 15 and extends between and is connected with the swivel pipe joint 165 and another swivel pipe joint 167 which is disposed coaxially with the pivotal axis of the arms 14 immediately outside of the other end of the shaft 16. See Figures 2, 6, 39 and 43. A pipe 168 leads from the swivel joint 167 to the in cylinders 39. Thus, opening of the valve 114 communicates fluid pressure in the high pressure line with the in cylinders 39 to operate the chute beam structure 11 rearwardly or inwardly, and opening of the valve 110 releases fluid pressure in the in cylinders 39 to permit rearward or inward movement of the chute beam structure 11.

It will be observed that, by reason of the swivel joints 158, 160, 165 and 167 and the pipes 159 and 166, the selective bodily and angular vertical movement of the chute beam structure 11 is not interfered with.

The valve 112 is connected under the head thereof and the valve 115 is connected above the head thereof with a passage 169 in the manifold 99 and a branched pipe 170 connects this passage with the forward lift cylinders 17. See Figures 39 and 40. Thus, opening of the valve 112 communicates fluid pressure in the high pressure line with the forward lift cylinders 17 to elevate the chute beam structure 11 forwardly, and opening of the valve 115 releases fluid pressure in the cylinders 17 to lower the chute beam structure 11 forwardly under the influence of gravity.

The valve 116 is connected under the head thereof and the valve 119 is connected above the head thereof with a passage 171 in the manifold 100, and a pipe 172 connects this passage with the rearward lift cylinder 29. See Figures 39 and 41. Thus, opening of the valve 116 communicates fluid pressure in the high pressure line with the rearward lift cylinder 29 to elevate the chute beam structure 11 rearwardly when the pins 28, hereinbefore described, are removed to release the arms 15, and opening of the valve 119 releases fluid pressure in the cylinder 29 to lower the chute beam structure 11 rearwardly under the influence of gravity.

The valve 120 is connected under the head thereof and the valve 117 is connected above the head thereof with a passage 173 in the manifold 100, and a pipe 174 connects this passage with a swivel pipe joint 175 which is disposed in axial alinement with the pivotal axis of and connected with one of the turning cylinders 42. See Figures 7, 39 and 46. Thus, opening of the valve 120 communicates fluid pressure in the high pressure line with this cylinder 42 to turn the turntable 5 in one direction, and opening of the valve 117 releases fluid pressure in this cylinder to permit turning of the turntable in the opposite direction.

The valve 118 is connected under the head thereof and the valve 121 is connected above the head thereof with a passage 176 in the manifold 100, and a pipe 177 connects this passage with a swivel pipe joint 178 which is disposed in axial alinement with the pivotal axis of and connected with the other turning cylinder 42. See Figures 7, 29 and 46. Thus, opening of the valve 118 communicates fluid pressure in the high pressure line with this cylinder to turn the turntable in the direction opposite that last mentioned, and opening of the valve 121 releases fluid pressure in this cylinder to permit turning of the turntable in the opposite direction.

The valves on the manifolds 99 and 100, with the exception of the valve 111, are normally closed, and the valve 111 which is normally open to by-pass the fluid pressure in the high pressure line to the low pressure line, closes against pressure in the high pressure line and acts as a throttle. The valves other than the valve 111 on the manifolds 99 and 100 are actuated by selective manipulation of the handles 155 to select the application of fluid pressure to the fluid pressure actuated devices above described, and, by means of the rocker member 153 and the rollers 154, the valve 111 is operated after a selection is effected by further movement of a selected handle 155 in the direction of selection to close the valve 111 to effect the fluid pressure which results in the selected operation.

A safety valve 179 is connected across the passages 102 and 103 of the manifold 99 and operates to release excessive pressure developed by the pump 52, this valve consisting of a valve head 180 closing against the pressure in the passage 103 and normally held closed against said pressure by a spring 181. See Figure 34.

An automatic check valve 182 is provided between each of the valves 109, 112, 114, 116, 118 and 120 and the respective fluid pressure actuated devices, and these check valves are arranged to open with the fluid pressure from the pump 52 and to close with pressure from the opposite direction to prevent pressure in the several fluid pressure actuated devices from passing into the passage 103 with the result that the fluid pressure actuated devices above mentioned are locked in position when the handles 155 are in their normal positions. See Figures 39, 40, 41, 43, 44 and 46. These valves are disposed in respective passages 156, 163, 169, 171, 173 and 176 of the manifold 99 and 100 and are spring pressed by springs 183 against the inner surfaces of the bodies of respective of the valves 109, 112, 114, 116, 118 and 120. See Figures 31 and 39.

Mounted on a rearward extension 185 of the turntable 5 is a third manifold 186 disposed vertically in a forwardly and rearwardly extending plane. See Figures 13, 14, 36 and 37. Secured against the outer face of this manifold are four poppet valves 187, 188, 189 and 190 which are similar in construction to the poppet valves, other than the valve 111, on the manifolds 99 and 100. These valves on the manifold 186 are arranged in vertical opposing banks, and close in the direction of opposing banks. A pivotally mounted vertical shaft 192 is disposed on the outside of the manifold 186 intermediate the banks of valves on this manifold. A sleeve 193 is secured on the upper portion of the shaft 192 and is provided with parallel radial fingers 194 which are interposed respectively between the stems of valves 187 and 189 and the stems of valves 188 and 190, so that with pivotal movement of the shaft 192 in one direction the valves 187 and 188 are opened and with pivotal movement of this shaft in the other direction the valves 189 and 190 are opened. An arm 195 is secured on the lower end of the shaft 192, and the outer end of this arm is pivotally connected with a connecting rod 196 which extends forwardly therefrom. See Figures 13 and 14. A hand lever 197 is pivotally mounted on the standard 27, on the side of the turntable corresponding with that on which the manifold 186 is disposed, and extends forwardly therefrom. This lever 197 is provided with a generally vertical arm 198 which is pivotally connected at its outer end with the front end of the connecting rod 196, so that pivotal movement of the lever 197 in opposite directions alternately opens the pairs of valves 187 and 188, and 189 and 190. A notched stationary sector 199 is disposed correspondingly with the pivotal axis of the lever 197, and a pawl 200, mounted on the lever 197, is spring pressed in a usual manner against the sector 199 for engagement in the notches thereof to hold the valves 187 and 188 open or to hold the valves 189 and 190 open as may be desired, a finger lever device 20 on the lever 197 providing means whereby the pawl 200 may be disengaged from the sector in a usual manner for the movement of the lever 197.

The hereinbefore mentioned pipes 97 and 98 are connected with respective cylinders 58 of the slushing pump by means of the respective swivel joints 94 and the pipes 92 and 93. Referring to Figures 39 and 45, the valve 187 is connected under the head thereof and the valve 189 is connected above the head thereof with a passage 203 in the manifold 186, and the pipe 97, which is connected with the larger cylinder 58, is connected with this passage. The valve 188 is connected under the head thereof and the valve 190 is connected above the head thereof with a passage 204 in the manifold 186, and the pipe 98, which is connected with the smaller cylinder 58, is connected with this passage. The valve 187 is connected above the head thereof with a pipe 205 which in turn is connected with the pipe 157 connected with the out cylinders 37. The valve 188 is connected above the head thereof with a pipe 206 which in turn is connected with the pipe 164 connected with the in cylinders 39.

The valves 189 and 190 are connected under the heads thereof with a passage 207 in the manifold 186, which passage is connected with the low pressure pipe 90, leading from the tank 88, by means of a pipe 208.

When the machine is being operated to scoop material, the valves 187 and 188 are closed to disconnect the slushing pump from the in and out cylinders and the valves 189 and 190 are open to connect the cylinders 58 with the low pressure pipe 90 and the tank 88. When these valves are so positioned the cylinders 58 are by-passed into the low pressure pipe and operation of the slushing pump simply effects a reciprocating fluid movement in the low pressure pipe and tank.

Assuming the valves 109, 110, 113 and 114 to be in their normal or closed positions the out cylinders 37 and the in cylinders 39 are sealed, except with respect to the pipes 205 and 206 which communicate with the valves 187 and 188 as hereinabove described, the valves 110 and 113 closing with pressure in the in and out cylinders and the check valves 182 of the valves 109 and 114 also closing with this pressure.

When it is desired to longitudinally vibrate the chute beam structure 11 the valves 109, 110, 113 and 144 are positioned in their said normal or closed positions, and the valves 187 and 188 are opened and the valves 189 and 190 are closed. The closing of the valves 189 and 190 disconnects the cylinders 58 from the low pressure pipe 90, and the opening of the valves 187 and 188 connects the larger cylinder 58 with the out cylinders 37 and the smaller cylinder 58 with the in cylinders 39, whereupon the vibration of the chute beam structure 11 is effected by the alternation of pressure in the in and out cylinders.

The actuation of the valves 187, 188, 189 and 190 is effected by the manual manipulation of the aforementioned lever 197, the pawl 200 in cooperation with the notched sector 199 selectively maintaining either the valves 187 and 188 or the valves 189 and 190 open.

In order that the plunger 59 operating in the cylinder 58 may draw fluid from the tank 88 when the valves 189 and 190 are closed so as to provide for possible leakage, automatic check valves 209 are provided between the passages 203 and 207 and the passages 204 and 207 of the manifold 186, and these check valves are arranged to open with suction effected by the plunger 59 operating in the cylinders 58 and consist of valve heads 210 normally held closed by springs 211. See Figures 36, 37 and 45.

Safety valves 212 are provided between the passages 203 and 207 and the passages 204 and 207 of the manifold 186, and these safety valves are arranged to open with excess pressure in the passages 203 and 204 and consist of valve heads 213 closing against the pressure in the passages 203 and 204 and normally held closed against said pressure by springs 214. See Figures 36 and 45.

Fluid pressure from the pressure pump 52 is supplied to and released from the holding jacks, hereinbefore described, in the following manner. See Figures 39 and 42. Two poppet valves 215 and 217, similar to the selecting poppet valves on the manifolds 99 and 100 and a check valve 216, are carried on the base 1 and the valves 215 and 217 are manually actuated in a manner unnecessary to be described. The valve 215 is connected above the head thereof with the high pressure pipe 91 by means of a pipe 218. The valves 215 and 216 are connected under the heads thereof by means of a passage 219. The valves 216 and 217 are connected above the heads thereof by means of a passageway 221, and this passage is connected with the cylinders 47 of the holding jacks by means of a branched pipe 222. The valve 217 is connected under the head thereof with the low pressure pipe 90 by means of a pipe 223. The valves 215 and 217 are opened and closed in alternation in a manner unnecessary to be described. When it is desired to introduce pressure into the jack cylinders 47 the valve 215 is opened, whereupon fluid pressure, developed by the pump 52 upon the closing of the by-pass valve 111, opens the check valve 216 and passes into the cylinders 47. The check valve 216 prevents pressure in the cylinders 47 from passing into the high pressure pipe 91. When it is desired to release pressure in the cylinders 47 the valve 217 is opened which communicates these cylinders with the low pressure pipe 90.

Certain features of the control valve structure, herein shown and described, are described and claimed in my co-pending U. S. application for Letters Patent, Serial Number 144,504, filed October 27th, 1926, for improvements in power shovels.

Although I have shown and described one embodiment of my invention, it will be understood that the arrangement and construction of the various parts may be changed or altered without departing from the spirit and scope thereof. Furthermore, I do not wish to be construed as limiting myself to the specific form illustrated, excepting as it may be limited in the appended claims.

I claim as my invention:

1. In a power shovel, the combination with a base, a turntable on said base and mounted for angular movement in a horizontal plane with respect thereto, a conveyor chute provided with a forwardly facing scoop at its front end and continuing the same, means on said turntable and carrying said chute for longitudinal thrusting and for selective angular and bodily vertical movement throughout a range of generally horizontal positions, manually controlled power means for effecting selectively said horizontal and vertical movement of said chute, and manually controlled power means for effecting automatically longitudinal vibration of said chute for effecting rearward movement of material on the chute for discharge.

2. In a power shovel, the combination with a conveyor provided with a scoop at its front end and communicating therewith, means carrying said conveyor for movement to effect operative movement of the scoop, means for effecting rearward movement of material on the conveyor for discharge, and a releasable gate for blocking discharge of material from the conveyor.

3. In a power shovel, the combination with a conveyor chute provided with a forwardly facing scoop at its front end and continuing the same, means carrying said chute for longitudinal generally horizontal thrusting and for vertical movement, means for effecting longitudinal vibration of said chute to effect rearward movement of material on the chute for discharge, and a releasable gate at the rear end of said chute for blocking discharge of material from the chute.

4. In a power shovel, the combination with a base, a turntable on said base and mounted for angular movement in a horizontal plane with respect thereto, a conveyor provided with a scoop at its front end and communicating therewith, means on said turntable and carrying said conveyor for longitudinal generally horizontal thrusting and for vertical movement, means for effecting rearward movement of material on the conveyor for discharge, and a releasable gate for blocking discharge of material from the conveyor.

5. In a power shovel, the combination with a base, a turntable on said base and mounted for angular movement in a horizontal plane with respect thereto, a conveyor chute provided with a forwardly facing scoop at its front end and continuing the same, means on said turntable and carrying said chute for longitudinal generally horizontal thrusting movement and for selective angular and bodily vertical movement throughout a range of generally horizontal positions, means for effecting longitudinal vibration of said chute for effecting rearward movement of material on the chute for discharge, and a releasable gate at the rear end of said chute for blocking discharge of material from the chute.

6. In a power shovel, the combination with a longitudinally movable conveyor chute provided with a forwardly facing scoop at its front end and communicating therewith, of power actuated means for longitudinally operating said chute, means for applying power to said power actuated means for effecting longitudinal thrusting of the chute, means for alternating automatically the application of power to said power actuated means to vibrate the chute for effecting movement of material rearwardly thereon for discharge, and manually controlled means for controlling selectively the application of power to said power actuated means by said power applying and power alternating means.

7. In a power shovel, the combination with a longitudinally movable conveyor chute provided with a forwardly facing scoop at its front end and continuing the same, of fluid pressure actuated means for longitudinally operating said chute, means for applying fluid pressure to said pressure actuated means for effecting thrusting of said chute, means for pulsating automatically fluid pressure to said pressure actuated means to vibrate said chute for effecting movement of material rearwardly thereon for discharge, and manually controlled means for controlling selectively the application of fluid pressure to said pressure actuated means by said pressure applying and pressure pulsating means.

8. In a power shovel, the combination with a longitudinally movable conveyor chute provided with a forwardly facing scoop at its front end and communicating therewith, of double acting fluid pressure actuated means for longitudinally operating said chute, a power driven fluid pressure pump for applying fluid pressure to said pressure actuated means for effecting thrusting of said chute, a power driven double acting reciprocating slushing pump for alternating automatically the application of fluid pressure to said pressure actuated means to vibrate said chute for effecting movement of material rearwardly thereon for discharge, and manually controlled means for controlling selectively the application of fluid pressure to said pressure actuated means by said pressure and slushing pumps.

9. In a device of the character described, the combination with a longitudinally movable conveyor chute, of fluid pressure actuated means for reciprocating said chute longitudinally, a reciprocating slushing pump for applying fluid pressure to said pressure actuated means for reciprocating the chute, and means for operating said slushing pump and adapted to effect a quicker reversal at one end of the movement of the pump than at the other.

10. In a device of the character described, the combination with a longitudinally movable conveyor chute, of fluid pressure actuated means for reciprocating said chute longitudinally, a reciprocating slushing pump for applying fluid pressure to said pressure actuated means for reciprocating the chute, a revoluble driving member, and translating means for reciprocating said pump with rotation of said driving member and adapted to effect a quicker reversal of the pump at one end of the movement thereof than at the other.

11. In a device of the character described, the combination with a longitudinally movable conveyor chute, of double acting fluid pressure actuated means for reciprocating the same longitudinally, a reciprocating double acting slushing pump for applying alternately fluid pressure to said pressure actuated means, a revoluble driving member, a pivoted member, a connecting link pivotally connected with said revoluble and pivoted members at radially disposed points thereon, and a second connecting link pivotally connected with the operating member of said pump and with said pivoted member at a radially disposed point thereon, the range of movements of the pivotal connections between said links and said pivoted member being differently disposed with respect to the respective dead centers thereof to effect a quicker reversal of the pump at one end of the movement thereof than at the other.

12. In a device of the character described, the combination with a longitudinally movable conveyor chute, of double acting fluid pressure actuated means for reciprocating the same longitudinally, a reciprocating double acting slushing pump for alternately applying fluid pressure to said pressure actuated means, a revoluble driving member, a pivoted member, a connecting link pivotally connected with said revoluble and pivoted members at radially disposed points thereon, and a second connecting link pivotally connected with the operating member of said pump and with said pivoted member at a radially disposed point thereon, the range of movement of the pivotal connection between said second link and said pivoted member being disposed nearer to a dead center of this connection than is the range movement of the pivotal connection between said first mentioned link and said pivoted member disposed with respect to a dead center of this last mentioned pivotal connection.

13. In a device of the character described, the combination with a longitudinally movable conveyor chute, of double acting fluid pressure actuated means for reciprocating the same longitudinally, a reciprocating double acting slushing pump for applying alternately fluid pressure to said pressure actuated means, a revoluble driving member, a pivoted member, a connecting link pivotally connected with said revoluble and pivoted members at radially disposed points thereon, and a second connecting link pivotally connected with the operating member of said pump and with said pivoted member at a radially disposed point thereon, the range of movement of the pivotal connection between said first mentioned link and said pivoted member being disposed midway between the dead centers of this connection and the range of movement of the pivotal connection between said second link and said pivoted member being disposed adjacent a dead center of this last mentioned pivotal connection.

14. In a device of the character described, the combination with a longitudinally movable conveyor chute, of fluid pressure actuated means for reciprocating said chute longitudinally, a power driven reciprocating slushing pump for pulsating the application of fluid pressure to said pressure actuated means, and manually controlled valve means for alternately operatively connecting said slushing pump with said pressure actuated means and by-passing said slushing pump.

15. In a device of the character described, the combination with a longitudinally movable conveyor chute, of fluid pressure actuating means for reciprocating said chute longitudinally, a power driven reciprocating slushing pump for pulsating the application of fluid pressure to said pressure actuated means, a fluid reservoir, manually controlled valve means for alternately operatively connecting said slushing pump with said fluid pressure actuated means and by-passing said slushing pump, and check valve means for permitting said pump to draw fluid from said reservoir independently of said manually controlled valve means.

16. In a device of the character described, the combination with a longitudinally movable conveyor chute, of double acting fluid pressure actuated means for reciprocating said chute longitudinally, a power driven double acting reciprocating slushing pump for alternating the application of fluid pressure to said pressure actuated means, and manually controlled valve means for alternately operatively connecting said slushing pump with said pressure actuated means and by-passing said slushing pump.

17. In a device of the character described, the combination with a longitudinally movable conveyor chute, of double acting fluid pressure actuated means for reciprocating said chute longitudinally, a fluid reservoir, a power driven reciprocating double acting slushing pump for alternating the application of fluid pressure to said pressure actuated means, manually controlled valve means for alternately operatively connecting said slushing pump with said pressure actuated means and by-passing said slushing pump to said reservoir, and check valve means for permitting said pump to draw fluid from said reservoir independently of said manually controlled valve means.

18. In a power shovel, the combination with a longitudinally movable conveyor chute provided with a scoop at its front end and communicating therewith, of fluid pressure actuated means for reciprocating said chute longitudinally, a power driven fluid pressure pump for applying fluid pressure to said pressure actuated means, a power driven reciprocating slushing pump for pulsating the application of fluid pressure to said pressure actuated means, and manually controlled valve means for operatively connecting selectively said pressure and slushing pumps with said pressure actuated means and adapted to by-pass said pumps when they are not so operatively connected.

19. In a power shovel, the combination with a longitudinally movable chute provided with a forwardly facing scoop at its front end and communicating therewith, of double acting fluid pressure actuated means for reciprocating said chute longitudinally, a prime mover, a fluid pressure pump driven by said prime mover for applying fluid pressure to said pressure actuated means, a double acting reciprocating slushing pump driven by said prime mover for alternating the application of fluid pressure to said pressure actuated means, and manually controlled valve means for operatively connecting selectively said pressure and slushing pumps with said pressure actuated means and adapted to by-pass said pumps when they are not so operatively connected.

20. In a power shovel, the combination with a chute provided with a forwardly facing scoop at its front end and communicating therewith, fluid pressure actuated means for reciprocating said chute longitudinally, a fluid reservoir, a power driven fluid pressure pump drawing fluid from said reservoir, a power driven reciprocating slushing pump for effecting pulsating said fluid pressure and supplied with fluid from said reservoir, and manually controlled valve means for operatively connecting selectively said pressure and slushing pumps with said pressure actuated means and adapted to by-pass said pumps to said reservoir when they are not so operatively connected.

21. In a power shovel, the combination with a chute provided with a forwardly facing scoop at its front end and communicating therewith, of double acting fluid pressure actuated means for reciprocating said chute longitudinally, a fluid reservoir, a prime mover, a fluid pressure pump driven by said prime mover and drawing fluid from said reservoir, a double acting reciprocating slushing pump driven by said prime mover, manually controlled valve means for operatively connecting selectively said pressure and slushing pumps with said pressure actuated means and adapted to by-pass said pumps in communication with said reservoir when they are not so connected, and check valve means for permitting said slushing pump to draw fluid from said reservoir independently of said manually controlled valve means.

22. In a power shovel, the combination with a beam, of a forwardly facing scoop on the front end of said beam, an arm extending longitudinally of said beam and carrying the same for longitudinal movement with respect thereto, a pivot mounting disposed on a horizontal axis transverse to the beam and carrying said arm for vertical angular movement, and means carrying said pivot mounting for vertical movement.

23. In a power shovel, the combination with a beam, of a forwardly facing scoop on the front end of said beam, a carrying member carrying said beam for longitudinal movement with respect thereto, an arm pivotally mounted on a horizontal axis transverse to the beam for vertical angular movement and pivotally connected to said carrying member on an axis parallel to said first mentioned axis.

24. In a power shovel, the combination with a beam, of a forwardly facing scoop on the front end of said beam, an arm extending longitudinally of said beam and carrying the same for longitudinal movement with respect thereto, and a second arm pivotally connected to said first mentioned arm on a rearwardly disposed horizontal axis transverse to the beam and pivotally mounted on a forwardly disposed axis parallel to said first mentioned axis.

25. In a machine of the character described, the combination with a beam, of a forwardly facing scoop on the front end of said beam, an arm structure extending longitudinally thereof and comprising a pair of arms disposed on opposite sides of said beam and carrying the same for longitudinal movement with respect thereto, and a second arm structure extending longitudinally of said beam and pivoted on a forwardly disposed horizontal axis transverse to said beam and carrying said first mentioned arm structure for pivotal movement with respect thereto on a rearwardly disposed axis parallel to said first mentioned axis and comprising a second pair of arms disposed on opposite sides of said beam.

26. In a machine of the character described, the combination with a conveyor chute beam structure, of an arm structure extending longitudinally thereof and comprising a pair of arms disposed on opposite sides of said beam structure and carrying the same for longitudinal movement with respect thereto, a second arm structure extending longitudinally of said beam structure and pivoted on a forwardly disposed horizontal axis transverse to said beam structure and carrying said first mentioned arm structure for pivotal movement with respect thereto on a rearwardly disposed axis parallel to said first mentioned axis and comprising a second pair of arms disposed on opposite sides of said beam, a pair of forwardly disposed vertical fluid pressure actuated devices arranged on opposite sides of said beam structure for effecting angular movement of said first mentioned arm structure, and a vertical fluid pressure actuated device disposed rearwardly of said pressure actuated devices and beneath said beam structure for effecting angular movement of said second arm structure.

27. In a power shovel, the combination with a beam, of a scoop on one end of the beam, means carrying the beam for longitudinal movement, means whereby the beam is carried for selective angular and bodily vertical movement, power means for effecting vertical angular movement of said beam, and a second power means cooperating with said first mentioned power means for effecting bodily vertical movement of the beam.

28. In a power shovel, the combination with a beam, of a forwardly facing scoop on the front end of said beam, an arm extening longitudinally of said beam and carrying the same for longitudinal movement with respect thereto, a second arm pivotally connected to said first mentioned arm on a rearwardly disposed horizontal axis transverse to the beam and pivotally mounted on a forwardly disposed axis parallel to said first mentioned axis, a forwardly disposed vertically arranged fluid pressure actuated means for pivotally operating said first mentioned arm, and a second vertically arranged fluid pressure actuated means disposed rearwardly of said first mentioned pressure actuated means for pivotally operating said second arm.

29. In a power shovel, the combination with a beam, of a forwardly facing scoop on the front end of said beam, an arm extending longitudinally of said beam and carrying the same for longitudinal movement with respect thereto, a second arm pivotally connected to said first mentioned arm on a rearwardly disposed horizontal axis transverse to the beam and pivotally mounted on a forwardly disposed axis parallel to said first mentioned axis, a single acting fluid pressure actuated means for effecting upward pivotal movement of said first mentioned arm, a second single acting fluid pressure actuated device for effecting upward pivotal movement of said second arm, and releasable means for locking said second arm against pivotal movement thereof.

30. In a power shovel, the combination with a beam, of a scoop on the beam, a member carrying said beam for longitudinal movement with respect thereto, means carrying said carrying member for selective vertical angular and bodily movement, power actuated means operative between said beam and carrying member for longitudinally actuating the beam, and power connecting means to said power actuated means and adapted to permit said angular and bodily movement of said carrying member.

31. In a power shovel, the combination with a beam, of a scoop on the beam, an arm extending longitudinally of the beam and carrying the same for longitudinal movement with respect thereto, a second arm pivotally connected to said first mentioned arm on a horizontal axis transverse to the beam and pivotally mounted on a second axis disposed parallel to said first mentioned axis, fluid pressure actuated means operative between said first mentioned arm and the beam for longitudinally actuating the beam, and a pair of power connections to said pressure actuated means each including a pair of swivel pipe joints disposed coaxially with respective of said axes and a pipe extending therebetween and movable with said second arm.

32. In a power shovel, the combination with a conveyor chute provided with a forwardly facing scoop at its front end and communicating therewith, of means carrying said chute for longitudinal and selective angular and bodily vertical movement throughout a range of generally horizontal positions, and means for longitudinally vibrating said chute for effecting rearward movement of material thereon for discharge.

33. In a power shovel, the combination with a base, of a turntable on the base and mounted for angular movement in a horizontal plane with respect thereto, a conveyor chute provided with a forwardly facing scoop at its front end and continuing the same, a member carrying said chute for longitudinal movement with respect thereto, means on said turntable and carrying said carrying member for selective angular and bodily vertical movement of the chute throughout a range of generally horizontal positions, means for longitudinally vibrating said chute on said carrying member for effecting rearward movement of material on the chute for discharge, and a releasable gate at the rear end of said chute for blocking discharge of material therefrom.

34. In a power shovel, the combination with a base, of a turntable on the base and angularly movable in a horizontal plane with respect thereto, a conveyor provided with a forwardly facing scoop at its front end and communicating therewith, means carrying the conveyor on the turntable for longitudinal generally horizontal thrusting and vertical movement with respect to the turntable, and a pair of vertically arranged holding jacks carried with the base and extending upwardly therefrom on opposite sides of said conveyor.

35. In a power shovel, the combination with a base, of a turntable on the base and angularly movable in a horizontal plane with respect thereto, a conveyor chute provided with a forwardly facing scoop at the front end thereof and continuing the same, means carrying the conveyor on the turntable for longitudinal generally horizontal thrusting and vertical movement with respect to the turntable, said turntable being provided with diametricaly opposite openings vertically therethrough on opposite sides of said conveyor, and a pair of vertically arranged holding jacks carried with the base and extending upwardly therefrom on opposite sides of said chute and through said openings in diametrically opposite relation with said turntable.

36. In a device of the character described, the combination with a conveyor chute beam structure comprising a pair of parallel beam members and a conveyor chute structure extending between said beam members and longitudinally thereof and secured thereto, of a pivoted arm structure arranged on an axis corresponding with the plane of said beam members and carrying the same for longitudinal movement with respect thereto.

37. In a machine of the character described, the combination with a conveyor chute beam structure comprising a pair of parallel channel beam members of U-shaped section arranged with the channels thereof facing outwardly in a common plane and a conveyor chute structure extending between said beam members and longitudinally thereof and secured thereto, of a pivoted arm structure arranged on an axis corresponding with said plane and comprising a pair of arm members disposed on the outsides of said beam members and carrying said beam members for longitudinal movement with respect thereto, and fluid pressure actuated devices for longitudinally operating said beam structure and extending longitudinally of the same between said beam and arm members and occupying space provided by the channels of said beam members.

38. In a machine of the character described, the combination with a base, of a turntable on said base and mounted for angular movement in a horizontal plane with respect thereto, fluid pressure actuated means carried with said turntable, a power driven fluid pressure pump carried by said base, a power driven reciprocating slushing pump carried on said base, power connections between said pressure actuated means and said pressure pump and between said pressure actuated means and said slushing pump including swivel joints disposed coaxially with said turntable, and valve means for operatively connecting selectively said pressure actuated means with said pressure and slushing pumps.

39. In a device of the character described, the combination with a base, of a turntable on said base and mounted for angular movement in a horizontal plane with respect thereto, double acting fluid pressure actuated means carried with said turntable, a power driven fluid pressure pump carried on said base, a fluid reservoir carried on said base, a power driven double acting reciprocating slushing pump carried on said base, pipe connections between said pressure pump and said pressure actuated means, said reservoir and said pressure actuated means, and said slushing pump and said pressure actuated means and including swivel joints disposed coaxially with said turntable, and manually controlled valve means for operatively connecting selectively said pressure actuated means with said pressure and slushing pumps and adapted to by-pass said pressure and slushing pumps to said reservoir when they are not operatively connected with said pressure actuated means.

40. In a machine of the character described, the combination with a base, of a turntable on said base and arranged above the same and mounted for angular movement in a horizontal plane with respect thereto, said base and said turntable being provided with central formations corresponding with the axis of said turntable and providing space below the normal horizontal plane of said turntable and accessible from above the turntable, and operative means associated with said turntable and projecting downwardly into said space.

41. In a machine of the character described, the combination with a base provided with a central vertical bore therethrough, of a turntable arranged above said base and provided with a central vertical bore therethrough and a central bored hub projecting downwardly therefrom and extending said bore of the turntable and journaled in said bore of the base for angular movement of the turntable with respect to the base, and operating means carried with said turntable and projecting downwardly into the space provided by said bores.

42. In a machine of the character described, the combination with a base provided with a central vertical bore therethrough, of a turntable arranged above said bore and provided with a central vertical bore therethrough and a central bored hub projecting downwardly therefrom and extending said bore of the turntable and journaled in said bore of the base for angular movement of the turntable with respect to the base, and operating means carried with said turntable including a vertically arranged fluid pressure device projecting downwardly into the space provided by said bores.

43. In a machine of the character described, the combination with a base provided with a central vertical bore therethrough and a central vertical bored hub extending said bore, of a turntable arranged above said base and provided with a central vertical bore therethrough and a central vertical bored hub projecting downwardly therefrom and extending said bore of the turntable and journaled in said bore of the base for angular movement of the turntable with respect to the base, a vertically arranged fluid pressure actuated device carried with the turntable and projecting downwardly into the space provided by said bores in eccentric relation therewith, and pipe connections leading to said turntable through said bores and including swivel joints disposed coaxially with said turntable.

44. In a machine of the character described, the combination with a base, of a turntable on said base and mounted for movement in a horizontal plane with respect thereto, a beam, means on said turntable and carrying said beam for operative movement in diametrical relation with and over said turntable, fluid pressure actuated devices, valve devices for controlling the application of fluid pressure to said pressure actuated devices and disposed on said turntable on opposite sides of said beam, and means whereby said valve devices are actuated selectively from one side of said beam.

45. In a machine of the character described, the combination with a base, of a turntable on said base and mounted for movement in a horizontal plane with respect thereto, a beam, means on said turntable and carrying said beam for operative movement in diametrical relation with and over said turntable, fluid pressure actuated devices, valve devices for controlling the application of fluid pressure to said pressure actuated devices and disposed on said turntable in vertical banks on opposite sides of said beam, and means whereby said valve devices are manually actuated selectively from one side of said beam including operating linkage extending between said banks underneath said beam.

46. In a machine of the character described, the combination with a base, of a turntable on said base and mounted for movement in a horizontal plane with respect thereto, a beam, means on said turntable and carrying said beam for operative movement in diametrical relation with and over said turntable, fluid pressure actuated devices, valve devices for controlling the application of power to said pressure actuated devices and disposed on said turntable in sets on opposite sides of said beam and including selecting valves and a throttle valve, manually actuated means whereby said selecting valves are actuated selectively from the side of said beam on which said throttle valve is disposed including operating linkage extending between said sets, and means whereby said throttle valve is actuated by said manually actuated means in coordination with said selecting valves.

47. In a power shovel, the combination with a base, a turntable on said base and mounted for angular movement in a horizontal plane with respect thereto, a conveyor provided with a forwardly facing scoop at its front end and communicating therewith and extending over and forwardly and rearwardly of said turntable and base, means on said turntable and carrying said conveyor for longitudinal generally horizontal thrusting and for vertical movement about an axis disposed rearwardly of said turntable from a position inclining downwardly toward its forward end to a relatively horizontal elevated position, power means for effecting said horizontal and vertical movement of said conveyor, and means for effecting rearward movement of material on the conveyor for discharge.

48. In a power shovel, the combination with a base, a turntable on said base and mounted for angular movement in a horizontal plane with respect thereto, a conveyor provided with a forwardly facing scoop at its front end and communicating therewith and extending over and forwardly and rearwardly of said turntable and base, means on said turntable and carrying said conveyor for longitudinal generally horizontal thrusting and for vertical movement about an axis disposed rearwardly of said turntable from a position inclining downwardly toward its forward end to a relatively horizontal elevated position, manually controlled power means for effecting said horizontal and vertical movement of said chute, and power means for effecting longitudinal vibration of said chute for effecting rearward movement of material on the chute for discharge.

49. In a power shovel, the combination with a base, a turntable on said base and mounted for angular movement in a horizontal plane with respect thereto, a conveyor provided with a forwardly facing scoop at its front end and communicating therewith and extending over and forwardly and rearwardly of said turntable and base, means on said turntable and carrying said conveyor for longitudinal generally horizontal thrusting and for vertical movement on a vertically adjustable rearwardly disposed axis from a position inclining downwardly toward its forward end to a relatively horizontal elevated position, power means for effecting said horizontal and vertical movement of said conveyor, and means for effecting rearward movement of material on the conveyor for discharge.

50. In a power shovel, the combination with a base, a turntable on said base and mounted for angular movement in a horizontal plane with respect thereto, a conveyor provided with a forwardly facing scoop at its front end and communicating therewith and extending over and forwardly and rearwardly of said turntable and base, means on said turntable and carrying said conveyor for longitudinal generally horizontal thrusting and for vertical movement on a vertically adjustable rearwardly disposed axis from a position inclining downwardly toward its forward end to a relatively horizontal elevated position, manually controlled power means for effecting said horizontal and vertical movement of said chute, and power means for effecting longitudinal vibration of said chute for effecting rearward movement of material on the chute for discharge.

51. In a power shovel, the combination with a base, a turntable on said base and mounted for angular movement in a horizontal plane with respect thereto, a conveyor provided with a forwardly facing scoop at its front end and communicating therewith and extending over and forwardly and rearwardly of said turntable and base, means on said turntable and carrying said conveyor for longitudinal generally horizontal thrusting and for vertical movement on a vertically adjustable rearwardly disposed axis from a position inclining downwardly toward its forward end to a relatively horizontal elevated position, power means for effecting elevation of said rearwardly disposed axis, power means for effecting said horizontal and vertical movement of said conveyor and means for effecting rearward movement of material on the conveyor for discharge.

52. In a power shovel, the combination with a base, a turntable on said base and mounted for angular movement in a horizontal plane with respect thereto, a conveyor provided with a forwardly facing scoop at its front end and communicating therewith and extending over and forwardly and rearwardly of said turntable and base, means on said turntable and carrying said conveyor for longitudinal generally horizontal thrusting and for vertical movement on a vertically adjustable rearwardly disposed axis from a position inclining downwardly toward its forward end to a relatively horizontal elevated position, power means for effecting elevation of said rearwardly disposed axis, power means independent of said last mentioned power means for effecting vertical movement of the forward portion of said conveyor, power means for effecting horizontal movement of said conveyor and means for effecting rearward movement of material on the conveyor for discharge.

53. In a power shovel, the combination with a base, a turntable on said base and mounted for angular movement in a horizontal plane with respect thereto, a conveyor provided with a forwardly facing scoop at its front end and communicating therewith and extending over and forwardly and rearwardly of said turntable and base, means on said turntable and carrying said conveyor for longitudinal generally horizontal thrusting and for vertical movement on a vertically adjustable rearwardly disposed axis from a position inclining downwardly toward its forward end to a relatively horizontal elevated position, power means for effecting elevation of said rearwardly disposed axis, power means for effecting said horizontal and vertical movement of said conveyor and power means for effecting longitudinal vibration of said chute for effecting rearward movement of material on the chute for discharge.

54. In a power shovel, the combination with a base, a turntable on said base and mounted for angular movement in a horizontal plane with respect thereto, a conveyor provided with a forwardly facing scoop at its front end and communicating therewith and extending over and forwardly and rearwardly of said turntable and base, means on said turntable and carrying said conveyor for longitudinal generally horizontal thrusting and for vertical movement on a vertically adjustable rearwardly disposed axis from a position inclining downwardly toward its forward end to a relatively horizontal elevated position, power means for effecting elevation of said rearwardly disposed axis, power means independent of said last mentioned power means for effecting vertical movement of the forward portion of said conveyor, power means for effecting horizontal movement of said conveyor, and power means for effecting longitudinal vibration of said chute for effecting rearward movement of material on the chute for discharge.

Signed at Chicago, in the county of Cook and State of Illinois, this 16th day of August, A. D. 1927.

WILLIAM W. SLOANE.